(12) United States Patent
Aiba et al.

(10) Patent No.: US 10,154,490 B2
(45) Date of Patent: Dec. 11, 2018

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/546,723

(22) PCT Filed: Jan. 7, 2016

(86) PCT No.: PCT/JP2016/050382
§ 371 (c)(1),
(2) Date: Jul. 27, 2017

(87) PCT Pub. No.: WO2016/121440
PCT Pub. Date: Aug. 4, 2016

(65) Prior Publication Data
US 2017/0374661 A1 Dec. 28, 2017

(30) Foreign Application Priority Data

Jan. 28, 2015 (JP) .................................. 2015-013826
Jul. 24, 2015 (JP) .................................. 2015-146247

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/1812* (2013.01); *H04L 5/001* (2013.01);
(Continued)

(58) Field of Classification Search
CPC . H04W 72/0446; H04W 72/12; H04W 88/02; H04W 88/08; H04L 5/0055; H04L 1/1812
(Continued)

(56) References Cited

U.S. PATENT DOCUMENTS

2013/0077542 A1* 3/2013 Yang .................. H04B 7/15542
370/280
2013/0336160 A1* 12/2013 Yin ....................... H04L 1/1854
370/254
(Continued)

FOREIGN PATENT DOCUMENTS

EP 2 639 984 A2 9/2013
EP 2 797 374 A1 10/2014

OTHER PUBLICATIONS

Official Communication issued in International Patent Application No. PCT/JP2016/050382, dated Mar. 22, 2016.
(Continued)

*Primary Examiner* — Faisal Choudhury
(74) *Attorney, Agent, or Firm* — Keating & Bennett, LLP

(57) ABSTRACT

A terminal device includes a transmission unit configured to transmit capability information, and channel state information (CSI) in a certain subframe. The capability information includes information used to indicate the number of first CSI processes supported by the terminal device in multiple serving cells, and information used to indicate the number of second CSI processes supported by the terminal device in one serving cell.

8 Claims, 8 Drawing Sheets

(51) Int. Cl.

| | | |
|---|---|---|
| *H04W 72/12* | (2009.01) | |
| *H04L 5/00* | (2006.01) | |
| *H04W 88/08* | (2009.01) | |
| *H04W 88/02* | (2009.01) | |
| *H04W 8/22* | (2009.01) | |
| *H04W 24/10* | (2009.01) | |
| *H04W 4/00* | (2018.01) | |

(52) U.S. Cl.
CPC ............ *H04L 5/0055* (2013.01); *H04W 8/22* (2013.01); *H04W 24/10* (2013.01); *H04W 72/04* (2013.01); *H04W 72/12* (2013.01); *H04W 88/02* (2013.01); *H04W 88/08* (2013.01); *Y02D 70/00* (2018.01)

(58) Field of Classification Search
USPC ......................................................... 370/329
See application file for complete search history.

(56) References Cited

U.S. PATENT DOCUMENTS

| | | | |
|---|---|---|---|
| 2014/0177555 A1* | 6/2014 | Ng ................... | H04W 72/0406 370/329 |
| 2016/0157226 A1* | 6/2016 | Moon ................ | H04B 7/2656 370/280 |
| 2017/0208582 A1* | 7/2017 | Liang ................ | H04W 24/00 |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 2014, pp. 1-124.

"3rd Generation Partnership Project; Technical Specification Group Radio Access Network; Evolved Universal Terrestrial Radio Access (E-UTRA); Multiplexing and channel coding (Release 12)", 3GPP TS 36.212 V12.3.0, Dec. 2014, pp. 1-89.

"3rd Generation Partnership Project; Technical Specification Group Radio Access Network; Evolved Universal Terrestrial Radio Access (E-UTRA); Physical layer procedures (Release 12)", 3GPP TS 36.213 V12.4.0, Dec. 2014, pp. 1-225.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.4.0, Dec. 2014, pp. 1-60.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1, Dec. 2014, pp. 1-410.

Nokia Corporation et al., "New WI proposal: LTE Carrier Aggregation Enhancement Beyond 5 Carriers", 3GPP TSG RAN Meeting #66, RP-142286, Dec. 8-11, 2014, 9 pages.

Intel Corporation, "Email discusson report on [89bis#20][LTE/CA] Capability signalling for contiguous CA", 3GPP TSG-RAN WG2 Meeting #90, R2-152255, May 25-29, 2015, pp. 1-7.

\* cited by examiner (a) 2-bit CSI Request field for PDCCH with uplink DCI format in UE-specific search space

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a 1st set of serving cells configured by higher layers |
| '11' | Aperiodic CSI report is triggered for a 2nd set of serving cells configured by higher layers |

FIG. 5A (b) 3-bit CSI Request field for PDCCH with uplink DCI format in UE-specific search space

| Value of CSI request field | Description |
|---|---|
| '000' | No aperiodic CSI report is triggered |
| '001' | Aperiodic CSI report is triggered for serving cell c |
| '010' | Aperiodic CSI report is triggered for a 1st set of serving cells configured by higher layers |
| '011' | Aperiodic CSI report is triggered for a 2nd set of serving cells configured by higher layers |
| '100' | Aperiodic CSI report is triggered for a 3rd set of serving cells configured by higher layers |
| '101' | Aperiodic CSI report is triggered for a 4th set of serving cells configured by higher layers |
| '110' | Aperiodic CSI report is triggered for a 5th set of serving cells configured by higher layers |
| '111' | Aperiodic CSI report is triggered for a 6th set of serving cells configured by higher layers |

FIG. 5B

- if DCI format 0 is used and IMCS = 29 or, if DCI format 4 is used and only 1 TB is enabled and IMCS = 29 for the enabled TB and the number of transmission layers is 1, and if

- the "CSI request" bit field is 1 bit and is set to trigger aperiodic CSI report, and NPRB ≤ 4, or

- the "CSI request" bit field is 2 bits and is triggering aperiodic CSI report for one serving cell according to Figure.5 (a), and NPRB ≤ 4, or.

- the "CSI request" bit field is 2 bits and is triggering aperiodic CSI report for more than one serving cell according to Figure.5 (a), and NPRB ≤ 20, or.

- the "CSI request" bit field is 3 bits and is triggering aperiodic CSI report for one serving cell according to Figure.5 (b), and NPRB ≤ 4, or.

- the "CSI request" bit field is 3 bits and is triggering aperiodic CSI report for more than one serving cells according to Figure.5 (b), and NPRB ≤ 20, or.

- the "CSI request" bit field is 3 bits and is triggering an aperiodic CSI report for more than five serving cells according to Figure.5 (b), and.

then there is no transport block for the UL-SCH and only the control information feedback for the current PUSCH reporting mode is transmitted by the UE.

FIG. 6

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

This application claims priority based on Japanese Patent Application No. 2015-013826 filed on Jan. 28, 2015 and Japanese Patent Application No. 2015-146247 filed on Jul. 24, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered (NPL 1, NPL 2, NPL 3, NPL 4, and NPL 5). In LTE, a base station device is also referred to as an evolved NodeB (eNodeB), and a terminal device is also referred to as user equipment (UE). LTE is a cellular communication system in which an area is divided into a plurality of cells to form a cellular pattern, each of the cells being served by a base station device. In such a cellular communication system, a single base station device may manage multiple cells.

LTE supports a time division duplex (TDD). LTE that employs a TDD scheme is also referred to as TD-LTE or LTE TDD. In TDD, uplink signals and downlink signals are time division multiplexed. Furthermore, LTE supports a frequency division duplex (FDD).

In 3GPP, carrier aggregation has been specified which allows a terminal device to perform simultaneous transmission and/or reception in up to five serving cells (component carriers).

In addition, in 3GPP, a configuration where a terminal device performs simultaneous transmission and/or reception in more than five serving cells (component carriers) has been considered (NPL 1). Furthermore, a configuration where a terminal device transmits a physical uplink control channel in a secondary cell which is a serving cell other than a primary cell has been considered (NPL 6).

CITATION LIST

Non-Patent Literature

NPL 1: "3GPP TS 36.211 V12.4.0 (2014-12) Evolved Universal Terrestrial Radio Access (E-UTRA); Physical channels and modulation (Release 12)", 6 Jan. 2015.

NPL 2: "3GPP TS 36.212 V12.3.0 (2014-12) Evolved Universal Terrestrial Radio Access (E-UTRA); Multiplexing and channel coding (Release 12)", 6 Jan. 2015.

NPL 3: "3GPP TS 36.213 V12.4.0 (2014-12) Evolved Universal Terrestrial Radio Access (E-UTRA); Physical layer procedures (Release 12)", 7 Jan. 2015.

NPL 4: "3GPP TS 36.321 V12.4.0 (2014-12) Evolved Universal Terrestrial Radio Access (E-UTRA); Medium Access Control (MAC) protocol specification (Release 12)", 5 Jan. 2015.

NPL 5: "3GPP TS 36.331 V12.4.1 (2014-12) Evolved Universal Terrestrial Radio Access (E-UTRA); Radio Resource Control (RRC); Protocol specification (Release 12)", 7 Jan. 2015.

NPL 6: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

DISCLOSURE OF THE INVENTION

Problems to be Solved by the Invention

However, for the radio communication system as described above, a concrete method when transmitting uplink control information has not been sufficiently discussed.

The present invention has been made in light of the foregoing, and an object of the present invention is to provide a terminal device, a base station device, a communication method, and an integrated circuit, which enable efficient transmission of uplink control information.

Means for Solving the Problems (1) In order to accomplish the object described above, aspects of the present invention are contrived to provide the following means. Specifically, a terminal device according to an aspect of the present invention is a terminal device including a transmission unit configured to transmit capability information, and channel state information (CSI) in a certain subframe. The capability information includes information used to indicate the number of first CSI processes supported by the terminal device in multiple serving cells, and information used to indicate the number of second CSI processes supported by the terminal device in one serving cell.

(2) A base station device according to an aspect of the present invention is a base station device including a reception unit configured to receive capability information, and channel state information (CSI) in a certain subframe. The capability information includes information used to indicate the number of first CSI processes supported by a terminal device in multiple serving cells, and information used to indicate the number of second CSI processes supported by the terminal device in one serving cell.

(3) A communication method according to an aspect of the present invention is a communication method of a terminal device. The method including the steps of transmitting capability information, and transmitting channel state information (CSI) in a certain subframe. The capability information includes information used to indicate the number of first CSI processes supported by the terminal device in multiple serving cells, and information used to indicate the number of second CSI processes supported by the terminal device in one serving cell.

(4) A communication method according to an aspect of the present invention is a communication method of a base station device. The method including the steps of receiving capability information, and receiving channel state information (CSI) in a certain subframe. The capability information includes information used to indicate the number of first CSI processes supported by a terminal device in multiple serving cells, and information used to indicate the number of second CSI processes supported by the terminal device in one serving cell.

(5) An integrated circuit according to an aspect of the present invention is an integrated circuit mounted on a terminal device, causing the terminal device to exert a function to transmit capability information, and channel state information (CSI) in a certain subframe. The capability information includes information used to indicate the number of first CSI processes supported by the terminal device in multiple serving cells, and information used to indicate the number of second CSI processes supported by the terminal device in one serving cell.

(6) An integrated circuit according to an aspect of the present invention is an integrated circuit mounted on a base station device, causing the base station device to exert a function to receive capability information, and channel state information (CSI) in a certain subframe. The capability information includes information used to indicate the number of first CSI processes supported by a terminal device in multiple serving cells, and information used to indicate the number of second CSI processes supported by the terminal device in one serving cell.

Effects of the Invention

According to the present invention, uplink control information can be transmitted efficiently.

BRIEF DESCRIPTION OF THE DRAWINGS

FIGS. 5A and 5B are diagrams for illustrating an aperiodic CSI report according to the present embodiment.

FIG. 6 is a diagram illustrating an instruction to transmit only uplink control information according to the present embodiment.

MODE FOR CARRYING OUT THE INVENTION

Embodiments of the present invention will be described below.

Figure 1:
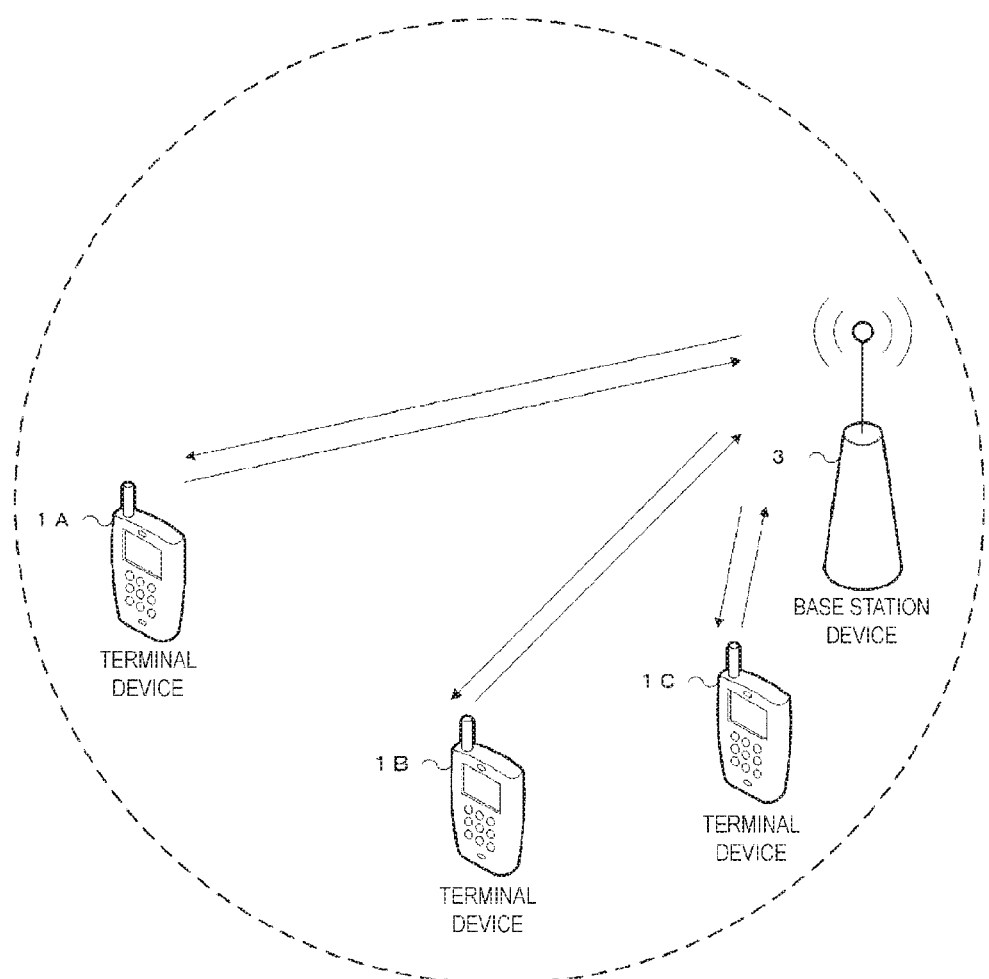
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each also referred to as a terminal device 1.

Physical channels and physical signals according to the present embodiment will be described.

In FIG. 1, in uplink radio communication from the terminal device 1 to the base station device 3, the following uplink physical channels are used. Here, the uplink physical channels are used to transmit information output from higher layers.

Physical uplink control channel (PUCCH)
Physical uplink shared channel (PUSCH)
Physical random access channel (PRACH)

The PUCCH is used to transmit uplink control information (UCI). Here, the uplink control information may include channel state information (CSI) used to indicate a downlink channel state. The uplink control information may include scheduling request (SR) used to request an UL-SCH resource. The uplink control information may include hybrid automatic repeat request acknowledgement (HARQ-ACK). HARQ-ACK may indicate HARQ-ACK for downlink data (transport block, medium access control protocol data unit (MAC PDU), downlink-shared channel (DL-SCH), or physical downlink shared channel (PDSCH)).

In other words, HARQ-ACK may indicate acknowledgement (ACK) or negative-acknowledgement (NACK). Here, HARQ-ACK may also be referred to as ACK/NACK, HARQ feedback, HARQ acknowledgement, HARQ information, or HARQ control information.

The PUSCH is used to transmit uplink data (uplink-shared channel (UL-SCH)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station device 3 and the terminal device 1 exchange (transmit and receive) signals with each other in higher layers. For example, the base station device 3 and the terminal device 1 may transmit and receive radio resource control (RRC) signaling (also referred to as RRC message or RRC information) to and from each other in an RRC layer. The base station device 3 and the terminal device 1 may transmit and receive a medium access control (MAC) element to and from each other in a MAC layer. Here, the RRC signaling and/or the MAC control element is also referred to as a higher layer signaling.

The PUSCH may be used to transmit the RRC signaling and the MAC control element. Here, the RRC signaling transmitted from the base station device 3 may be signaling common to multiple terminal devices 1 in a cell. The RRC signaling transmitted from the base station device 3 may be signaling dedicated to a certain terminal device 1 (also referred to as dedicated signaling). In other words, user-equipment-specific information (information unique to user equipment) may be transmitted through signaling dedicated to the certain terminal device 1.

The PRACH is used to transmit a random access preamble. The PRACH may be used for an initial connection establishment procedure, a handover procedure, a connection re-establishment procedure, uplink transmission synchronization (timing adjustment), and indicating a PUCCH resource request.

In FIG. 1, the following uplink physical signal is used in the uplink radio communication. Here, the uplink physical signal is not used to transmit information output from higher layers but is used by a physical layer.

Uplink reference signal (ULRS)

According to the present embodiment, the following two types of uplink reference signals are used.

Demodulation reference signal (DMRS)
Sounding reference signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to as simply as transmission of the PUSCH. Transmission of both of the PUCCH and the DMRS is hereinafter referred to as simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. Here, the downlink physical channel is used to transmit the information output from higher layers.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB), or a broadcast channel (BCH), that is shared by the terminal devices 1.

The PCFICH is used to transmit information indicating a region (OFDM symbols) to be used for transmission of the PDCCH.

The PHICH is used to transmit a HARQ indicator (HARQ feedback or acknowledgement information) indicating acknowledgement (ACK) or negative acknowledgement (NACK) with respect to the uplink data (uplink shared channel (UL-SCH)) received by the base station device 3.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, DCI formats for downlink (for example, DCI format 1A and DCI format 1C) to be used for the scheduling of one PDSCH in one cell (transmission of a single downlink transport block) may be defined.

Here, each of the downlink DCI formats includes information on the scheduling of the PDSCH. For example, the downlink DCI format includes downlink control information such as a carrier indicator field (CIF), information on resource block assignment, or information on a modulation and coding scheme (MCS). Here, the downlink DCI format is also referred to as downlink grant or downlink assignment.

Furthermore, for example, DCI formats for uplink (for example, DCI format 0 and DCI format 4) to be used for the scheduling of one PUSCH in one cell (transmission of a single uplink transport block) are defined.

Here, each of the uplink DCI formats includes information on the scheduling of the PUSCH. For example, the uplink DCI format includes downlink control information such as a carrier indicator field (CIF), information on resource block assignment and/or hopping resource allocation, information on modulation and coding scheme (MCS) and/or redundancy version, or information used for indicating the number of transmission layers (precoding information and the number of layers). Here, the uplink DCI format is also referred to as uplink grant or uplink assignment.

In a case that a PDSCH resource is scheduled in accordance with the downlink assignment, the terminal device 1 may receive downlink data on the scheduled PDSCH. In a case that a PUSCH resource is scheduled in accordance with the uplink grant, the terminal device 1 may transmit uplink data and/or uplink control information on the scheduled PUSCH.

Here, the terminal device 1 may monitor a set of PDCCH candidates and/or EPDCCH candidates. The PDCCH may indicate a PDCCH and/or an EPDDCH below. Here, the PDCCH candidates are candidates which the PDCCH may be mapped to and/or transmitted on by the base station device 3. Furthermore "monitor" may include the meaning that the terminal device 1 attempts to decode each PDCCH in the set of PDCCH candidates in accordance with each of all the monitored DCI formats.

The set of PDCCH candidates to be monitored by the terminal device 1 is also referred to as a search space. The search space may include a common search space (CSS). For example, the common search space may be defined as a space common to multiple terminal devices 1. The search space may include a UE-specific search space (USS). For example, the UE-specific search space may be defined at least on the basis of a C-RNTI assigned to the terminal device 1. The terminal device 1 may monitor PDCCHs in CSS/or USS to detect a PDCCH destined for the terminal device 1 itself.

Here, an RNTI assigned to the terminal device 1 by the base station device 3 is used for the transmission of downlink control information (transmission on the PDCCH). Specifically, cyclic redundancy check (CRC) parity bits are attached to a DCI format (or downlink control information), and after the attachment, the CRC parity bits are scrambled by the RNTI. Here, the CRC parity bits attached to the DCI format may be obtained from the payload of the DCI format.

The terminal device 1 attempts to decode the DCI format to which the CRC parity bits scrambled by the RNTI are attached, and detects, as a DCI format destined for the terminal device 1 itself, the DCI format for which the CRC has been successful (also referred to as blind coding). In other words, the terminal device 1 may detect the PDCCH with CRC scrambled by the RNTI. The terminal device 1 may detect the PDCCH including the DCI format to which the CRC parity bits scrambled with the RNTI are attached.

Here, the RNTI may include a cell-radio network temporary identifier (C-RNTI). The C-RNTI is an identifier unique to the terminal device 1 and used for the identification in RRC connection and scheduling. The C-RNTI may be used for dynamically scheduled unicast transmission.

The RNTI may further include a semi-persistent scheduling C-RNTI (SPS C-RNTI). The SPS C-RNTI is an identifier unique to the terminal device 1 and used for semi-persistent scheduling. The SPS C-RNTI may be used for semi-persistently scheduled unicast transmission.

The PDSCH is used to transmit downlink data (downlink shared channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (multicast channel (MCH)).

In FIG. 1, in the downlink radio communication, the following downlink physical signals are used. Here, the downlink physical signals are not used to transmit the information output from the higher layers but is used by the physical layer.

Synchronization signal (SS)
Downlink reference signal (DLRS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used in order for the terminal device 1 to perform the channel compensation of the downlink physical channel. The downlink reference signal is used in order for the terminal device 1 to obtain the downlink channel state information.

According to the present embodiment, the following seven types of downlink reference signals are used.

Cell-specific reference signal (CRS)
UE-specific reference signal (URS) associated with the PDSCH
Demodulation reference signal (DMRS) associated with the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a medium access control (MAC) layer is referred to as a transport channel. The unit of the transport channel used in the MAC layer is referred to as a transport block (TB) or a MAC protocol data unit (PDU). Control of hybrid automatic repeat request (HARQ) is performed on each transport block in the MAC layer. The transport block is a unit of data that the MAC layer delivers to the physical layer. In the physical layer, the transport block is mapped to a codeword and subject to coding processing on a codeword-by-codeword basis.

Carrier aggregation will be described below.

In the present embodiment, one or multiple serving cells may be configured for the terminal device 1. A technology in which the terminal device 1 communicates via multiple serving cells is referred to as cell aggregation or carrier aggregation.

Here, the present embodiment may apply to one or each of the multiple serving cells configured for the terminal device 1. Alternatively, the present embodiment may apply to one or some of the multiple serving cells configured for the terminal device 1. Alternatively, the present embodiment may apply to one or each of the multiple serving cell groups (for example, PUCCH cell groups) configured for the terminal device 1, which will be described later. Alternatively, the present embodiment may apply to one or some of the multiple serving cell groups configured for the terminal device 1.

In the present embodiment, time division duplex (TDD) and/or frequency division duplex (FDD) may be applied. Here, for carrier aggregation, TDD or FDD may apply to one or all of the multiple serving cells. Alternatively, serving cells to which TDD applies and serving cells to which FDD applies may be aggregated. Here, a frame structure for FDD is also referred to as frame structure type 1. A frame structure for TDD is referred to as frame structure type 2.

Here, the one or multiple configured serving cells include one primary cell and one or multiple secondary cells. The primary cell may be a serving cell in which an initial connection establishment procedure has been performed, a serving cell in which a connection re-establishment procedure has been initiated, or a cell designated as a primary cell during a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the primary cell is used for the transmission on the PUCCH. The primary cell cannot be deactivated. The cross-carrier scheduling does not apply to the primary cell. In other words, the primary cell is always scheduled via its PDCCH.

In a case that PDCCH (PDCCH monitoring) of a secondary cell is configured, cross carrier scheduling may not apply to this secondary cell. To be more specific, in this case, the secondary cell may always be scheduled via its PDCCH. In a case that no PDCCH (PDCCH monitoring) of a secondary cell is configured, cross-carrier scheduling applies to the secondary cell, and the secondary cell may always be scheduled via the PDCCH in one other serving cell.

Here, in the present embodiment, a secondary cell used for transmission on the PUCCH is referred to as a PUCCH secondary cell or a special secondary cell. In the present embodiment, a secondary cell not used to transmit a PUCCH is referred to as a non-PUCCH secondary cell, a non-special secondary cell, a non-PUCCH serving cell, or a non-PUCCH cell. The primary cell and the PUCCH secondary cell are collectively referred to as a PUCCH serving cell or a PUCCH cell.

Here, the PUCCH serving cell (the primary cell or the PUCCH secondary cell) always includes a downlink component carrier and an uplink component carrier. In the PUCCH serving cell (the primary cell or the PUCCH secondary cell), PUCCH resources are configured.

The non-PUCCH serving cell (the non-PUCCH secondary cell) may include a downlink component carrier only. Alternatively, the non-PUCCH serving cell (the non-PUCCH secondary cell) may include a downlink component carrier and an uplink component carrier.

The terminal device 1 performs transmission on the PUCCH in the PUCCH serving cell. To be more specific, the terminal device 1 performs transmission on the PUCCH in the primary cell. Moreover, the terminal device 1 performs transmission on the PUCCH in the PUCCH secondary cell. Moreover, the terminal device 1 does not perform transmission on the PUCCH in the non-special secondary cell.

Here, the PUCCH secondary cell may be defined as a serving cell that is neither a primary cell nor a secondary cell.

To be more specific, the PUCCH secondary cell is used for the transmission on the PUCCH. The PUCCH secondary cell may not be deactivated. Here, as will be described later, the PUCCH secondary cell may be activated and/or deactivated.

Cross-carrier scheduling may not apply to PUCCH secondary cell. In other words, PUCCH secondary cell is always scheduled via its PDCCH. Here, cross-carrier scheduling may apply to PUCCH secondary cell. To be more specific, the PUCCH secondary cell may be scheduled via the PDCCH in another serving cell.

For example, in a case that PDCCH (PDCCH monitoring) of a PUCCH secondary cell is configured, cross-carries scheduling may not apply this PUCCH secondary cell. To be more specific, in this case, the PUCCH secondary cell may always be scheduled via its PDCCH. In a case that no PDCCH (PDCCH monitoring) of the PUCCH secondary cell is configured, cross-carrier scheduling applies to the PDCCH secondary cell, and the secondary cell may always be scheduled via the PDCCH in another serving cell.

Here, linking may be defined between the uplink (for example, the uplink component carrier) and the downlink (for example, the downlink component carrier). In other words, on the basis of the linking between the uplink and the downlink, the serving cell responsible for a downlink assignment (the serving cell in which transmission on the PDSCH scheduled in accordance with the downlink assignment (downlink transmission) is performed) may be identified. Moreover, on the basis of the linking between the uplink and the downlink, the serving cell responsible for an uplink grant (the serving cell in which transmission on the PUSCH scheduled in accordance with the uplink grant (uplink transmission) is performed) may be identified. Here, no carrier indicator field is present in the downlink assignment or the uplink grant.

In other words, the downlink assignment received in the primary cell may correspond to downlink transmission in the primary cell. Moreover, the uplink grant received in the primary cell may correspond to uplink transmission in the primary cell. The downlink assignment received in the PUCCH secondary cell may correspond to downlink transmission in the PUCCH secondary cell. Moreover, the uplink grant received in the PUCCH secondary cell may correspond to uplink transmission in the PUCCH secondary cell.

The downlink assignment received in a certain secondary cell (the PUCCH secondary cell and/or the non-PUCCH secondary cell) may correspond to downlink transmission in the certain secondary cell. Moreover, the uplink grant received in a certain secondary cell (the PUCCH secondary cell and/or the non-PUCCH secondary cell) may correspond to uplink transmission in the certain secondary cell.

A configuration of a slot according to the present embodiment will be described below.

Figure 2:
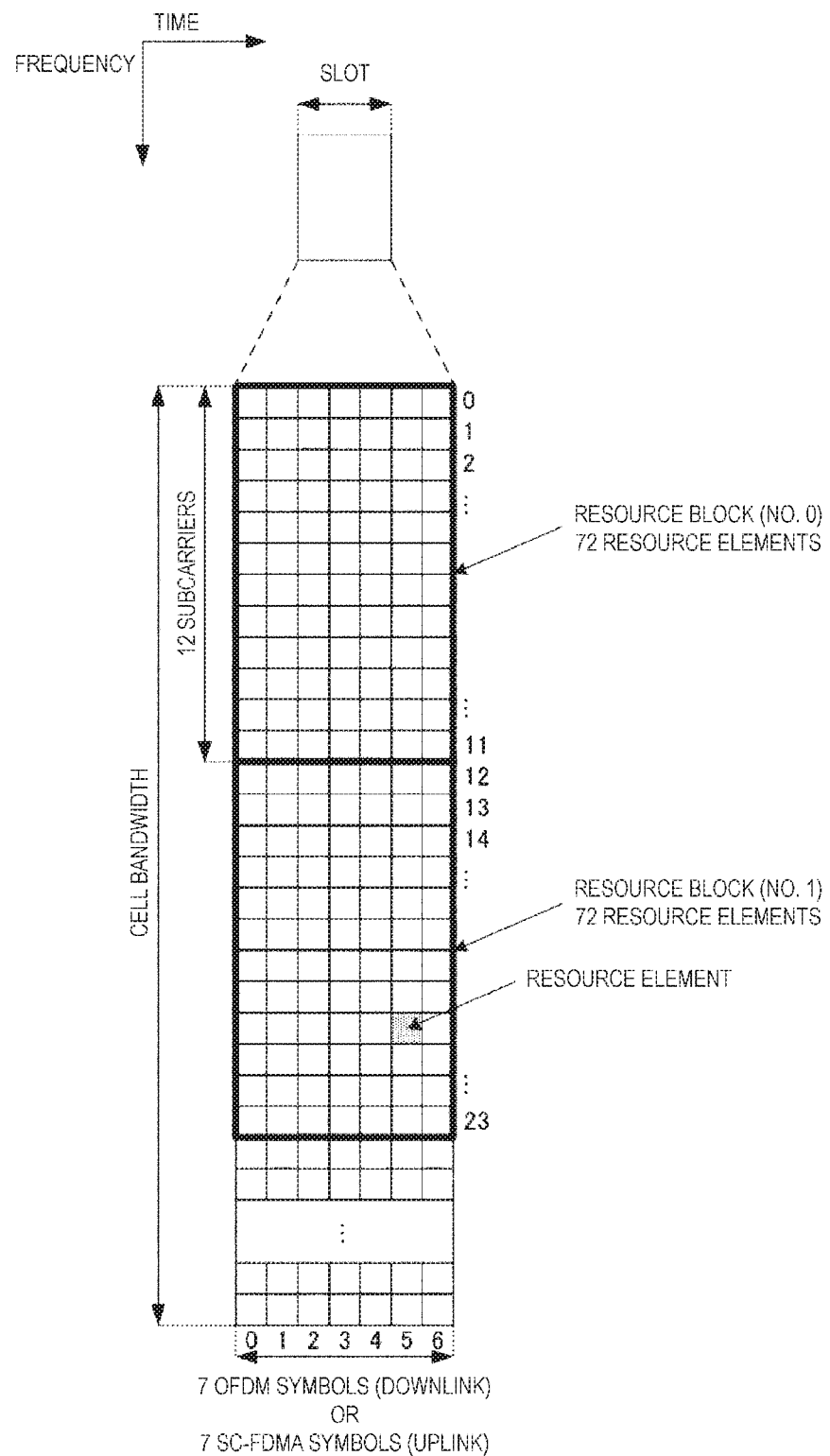
FIG. 2 is a diagram illustrating a configuration of a slot according to the present embodiment.

FIG. 2 is a diagram illustrating the configuration of the slot according to the present embodiment. In FIG. 2, the horizontal axis represents a time axis, and the vertical axis represents a frequency axis. Here, a normal cyclic prefix (CP) may apply to an OFDM symbol. Alternatively, an extended cyclic prefix (CP) may apply to the OFDM symbol. The physical signal or the physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (the PDSCH, the PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and by 12 consecutive subcarriers in the frequency domain. Thus, one physical resource block may be constituted of (7×12) resource elements. Furthermore, one physical resource block may correspond to one slot in the time domain and correspond to 180 kHz in the frequency domain. The physical resource blocks may be numbered from zero in the frequency domain.

Figure 3A:
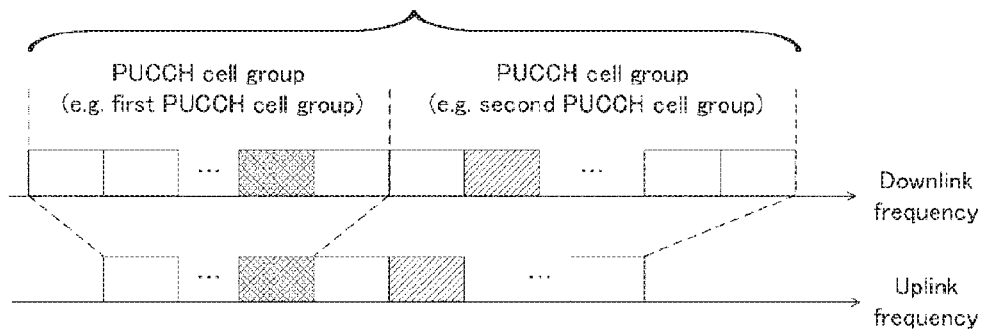
FIGS. 3A to 3C are diagrams illustrating PUCCH cell groups according to the present embodiment.
Figure 3B:
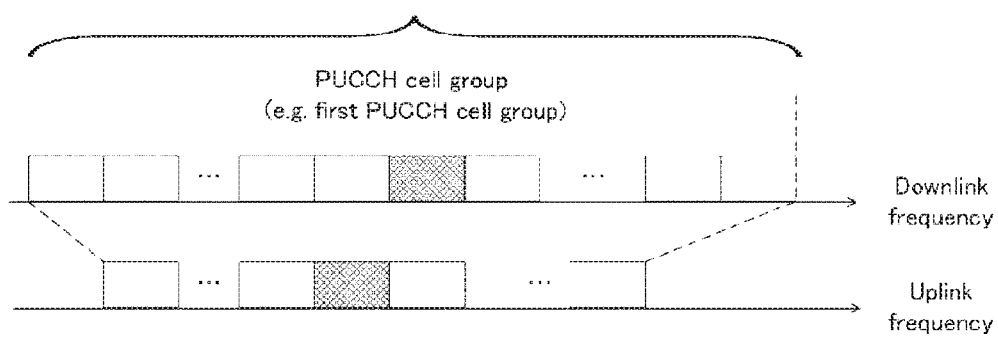
Figure 3C:
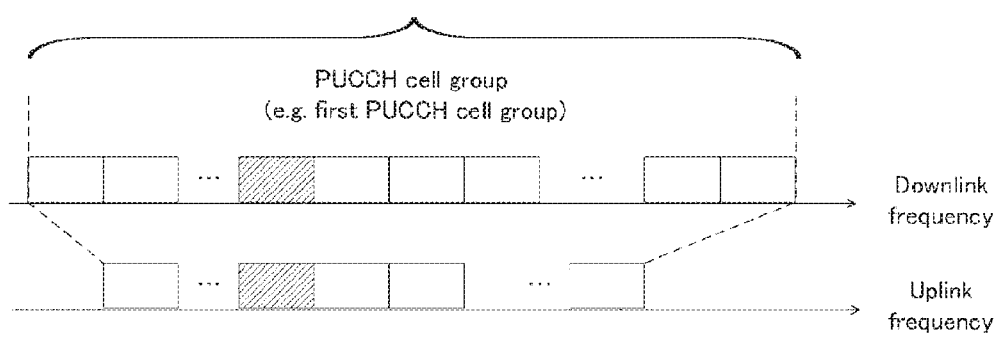

FIGS. 3A to 3C are diagrams illustrating PUCCH cell groups according to the present embodiment. In FIGS. 3A to 3C, three examples (Example (a), Example (b), and Example (c)) are provided as examples of a configuration (constitution or definition) of a PUCCH cell group. Here, in the present embodiment, a group of multiple serving cells is referred to as a PUCCH cell group. The PUCCH cell group may be a group associated with transmission on the PUCCH (transmission of uplink control information on the PUCCH). Here, a certain serving cell belongs to any one of PUCCH cell groups. Here, it goes without saying that the PUCCH cell group may be configured differently from the examples illustrated in FIGS. 3A to 3C.

Here, the base station device 3 and/or the terminal device 1 in the present embodiment may support carrier aggregation of up to 32 downlink component carriers (downlink cells), for example. In other words, the base station device 3 and the terminal device 1 can simultaneously perform transmission and/or reception on multiple physical channels in up to 32 serving cells. Here, the number of uplink component carriers may be less than the number of downlink component carriers.

For example, the base station device 3 may configure the PUCCH cell group. For example, the base station device 3 may transmit higher layer signaling including information to be used to configure the PUCCH cell group. For example, an index (cell group index or information) for identifying a corresponding PUCCH cell group may be configured (defined), and the base station device 3 may transmit higher layer signaling including the index to be used to identify the corresponding PUCCH cell group.

FIG. 3A illustrates a configuration where a first PUCCH cell group and a second PUCCH cell group are configured as the PUCCH cell groups. For example, in FIG. 3A, the base station device 1 may transmit a downlink signal in the first PUCCH cell group, and the terminal device 3 may transmit an uplink signal in the first PUCCH cell group (may transmit uplink control information on the PUCCH in the first PUCCH cell group). For example, in a case that 20 serving cells (downlink component carriers or downlink cells) are configured or activated in the first PUCCH cell group, the base station device 3 and the terminal device 1 may transmit and receive uplink control information for the 20 downlink component carriers to and from each other.

To be more specific, the terminal device 1 may transmit HARQ-ACK for the 20 downlink component carriers (HARQ-ACK for transmission on the PDSCH and HARQ-ACK for transport blocks). The terminal device 1 may transmit CSI corresponding to each of the 20 downlink component carriers. The terminal device 1 may transmit SR per PUCCH cell group. Similarly, the base station device 3 and the terminal device 1 may transmit and receive uplink control information to and from each other in the second PUCCH cell group.

Similarly, the base station device 3 and the terminal device 1 may configure a PUCCH cell group as illustrated in FIG. 3B, and transmit and receive uplink control information to and from each other. The base station device 3 and the terminal device 1 may configure a PUCCH cell group as illustrated in FIG. 3C, and transmit and receive uplink control information to and from each other.

Here, one PUCCH cell group may include at least one PUCCH serving cell. One PUCCH cell group may include one PUCCH serving cell only. One PUCCH cell group may include one PUCCH serving cell and one or multiple non-PUCCH serving cells.

Here, the PUCCH cell group including the primary cell is referred to as a primary PUCCH cell group. The PUCCH cell group not including the primary cell is referred to as a secondary PUCCH cell group. In other words, the secondary PUCCH cell group may include a PUCCH secondary cell. For example, the index for the primary PUCCH cell group may always be defined as 0. The index for the secondary PUCCH cell group may be configured by the base station device 3 (or a network device).

The base station device 3 may transmit information to be used to indicate the PUCCH secondary cell, with the information included in higher layer signaling and/or the PDCCH (downlink control information transmitted on the PDCCH). The terminal device 1 may determine the PUCCH secondary cell in accordance with the information to be used to indicate the PUCCH secondary cell.

As described above, the PUCCH in the PUCCH serving cell may be used to transmit uplink control information (HARQ-ACK, CSI (for example, periodic CSI), and/or SR) for serving cells (the PUCCH serving cell and the non-PUCCH serving cell) included in the PUCCH cell group to which the PUCCH serving cell belongs.

In other words, uplink control information (HARQ-ACK, CSI (for example, periodic CSI), and/or SR) for the serving cells (the PUCCH serving cell and the non-PUCCH serving cell) included in the PUCCH cell group is transmitted on the PUCCH in the PUCCH serving cell included in the PUCCH cell group.

Here, the present embodiment may apply only to transmission of HARQ-ACK. Alternatively, the present embodiment may apply only to transmission of CSI (for example, periodic CSI). Alternatively, the present embodiment may apply only to transmission of SR. Alternatively, the present embodiment may apply to transmission of HARQ-ACK, transmission of CSI (for example, periodic CSI), and/or transmission of SR.

In other words, for example, a PUCCH cell group for transmission of HARQ-ACK may be configured. A PUCCH cell group for transmission of CSI (for example, periodic CSI) may be configured. A PUCCH cell group for transmission of SR may be configured.

For example, a PUCCH cell group for transmission of HARQ-ACK, a PUCCH cell group for transmission of CSI (for example, periodic CSI), and/or a PUCCH cell group for transmission of SR may be configured separately. Alternatively, a common PUCCH cell group may be configured as a PUCCH cell group for transmission of HARQ-ACK, a PUCCH cell group for transmission of CSI (for example, periodic CSI), and/or a PUCCH cell group for transmission of SR.

Here, the number of PUCCH cell groups for transmission of HARQ-ACK may be one. The number of PUCCH cell groups for transmission of CSI may be one. The number of PUCCH cell groups for transmission of SR may be one.

As will be described later, a PUCCH cell group for transmission of CSI (for example, periodic CSI) and/or a PUCCH cell group for transmission of SR does not need to be configured.

Here, multiple formats may be defined (supported) for the PUCCH. Each format supported for the PUCCH (the format that the PUCCH supports) is also referred to as a PUCCH format. For example, the use of the following PUCCH formats allows combinations of pieces of uplink control information on the PUCCH (transmission of combinations of pieces of uplink control information) to be supported.

Format 1
Format 1a
Format 1b
Format 2
Format 2a
Format 2b
Format 3
Format 4

PUCCH format 1 may be defined for positive SR. For example, the positive SR may be used to indicate that an UL-SCH resource is requested. Here, negative SR may be used to indicate that an UL-SCH resource is not requested. PUCCH format 1 is also referred to as a first PUCCH format below.

PUCCH format 1a may be defined for 1-bit HARQ-ACK or 1-bit HARQ-ACK with positive SR. PUCCH format 1b may be defined for 2-bit HARQ-ACK or 2-bit HARQ-ACK with positive SR. PUCCH format 1b may be defined for transmission of up to 4-bit HARQ-ACK with channel selection. PUCCH format 1a and/or PUCCH format 1b is also referred to as a second PUCCH format below.

PUCCH format 2 may be defined for a CSI report when not multiplexed with HARQ-ACK. PUCCH format 2a may be defined for a CSI report multiplexed with 1-bit HARQ-ACK. PUCCH format 2b may be defined for a CSI report multiplexed with 2-bit HARQ-ACK. Here, PUCCH format 2 may be defined for a CSI report multiplexed with HARQ-ACK for extended cyclic prefix. PUCCH format 2, PUCCH format 2a, and/or PUCCH format 2b is also referred to as a third PUCCH format below.

PUCCH format 3 may be defined for up to 10-bit HARQ-ACK. Alternatively, PUCCH format 3 may be defined for up to 11-bit corresponding to up to 10-bit HARQ-ACK and 1-bit positive/negative SR. In other words, 1-bit information may indicate whether it is positive SR or negative SR. Here, up to 10-bit HARQ-ACK and up to 11-bit corresponding to 10-bit HARQ-ACK and 1-bit positive/negative SR may be defined for FDD.

PUCCH format 3 may be defined for up to 20-bit HARQ-ACK. Alternatively, PUCCH format 3 may be defined for up to 21-bit corresponding to up to 20-bit HARQ-ACK and 1-bit positive/negative SR. Here, up to 20-bit HARQ-ACK and up to 21-bit corresponding to 20-bit HARQ-ACK and 1-bit positive/negative SR may be defined for TDD.

PUCCH format 3 may be defined for HARQ-ACK and a CSI report for one serving cell. Alternatively, PUCCH format 3 may be defined for HARQ-ACK, 1-bit positive/ negative SR (if any), and a CSI report for one serving cell. PUCCH format 3 is also referred to as a fourth PUCCH format below.

PUCCH format 4 may be defined for HARQ-ACK corresponding to up to 32 serving cells (downlink component carriers or downlink cells). Alternatively, PUCCH format 4 may be defined for HARQ-ACK and a CSI report. Alternatively, PUCCH format 4 may be defined for HARQ-ACK and SR. Alternatively, PUCCH format 4 may be defined for HARQ-ACK, SR, and a CSI report. Here, the CSI report may be a CSI report for one serving cell. Alternatively, the CSI report may be a CSI report for multiple serving cells. SR may be positive SR and/or negative SR. PUCCH format 4 is also referred to as a fifth PUCCH format below.

Here, for example, a UE that supports aggregating at most 2 serving cells with frame structure type 1 may use PUCCH format 1b with a channel selection for transmission of HARQ-ACK when configured with more than one serving cell with frame structure type 1.

A UE that supports aggregating more than 2 serving cells with frame structure type 1 may be configured by higher layers to use either PUCCH format 1b with channel selection or PUCCH format 3 for transmission of HARQ-ACK when configured with more than one serving cell with frame structure type 1. In other words, the base station device 3 may make a configuration through higher layer signaling in order for the terminal device 1 to use either PUCCH format 1b with channel selection or PUCCH format 3.

A UE that supports aggregating more than 5 serving cells with frame structure type 1 may be configured by the higher layers to use any one of PUCCH format 1b with channel selection, PUCCH format 3, or PUCCH format 4 for transmission of HARQ-ACK when configured with more than one serving cell with frame structure type 1.

Here, the base station device 3 configure, by using the higher layer signaling and/or the PDCCH (downlink control information transmitted on the PDCCH), for the terminal device 1, to use any one of PUCCH format 1b with channel selection, PUCCH format 3, or PUCCH format 4.

Here, the terminal device 1 may be configured by higher layers to use any one of PUCCH format 1b with channel selection, PUCCH format 3, or PUCCH format 4 for transmission of HARQ-ACK when configured with more than five serving cells with frame structure type 1. The terminal device 1 may be configured by the higher layers to use any one of PUCCH format 1b with channel selection, PUCCH format 3, or PUCCH format 4 for transmission of HARQ-ACK when more than five serving cells with frame structure type 1 are activated.

The terminal device 1 may be configured by higher layers to use any one of PUCCH format 1b with channel selection, PUCCH format 3, or PUCCH format 4 for transmission of HARQ-ACK when the PUCCH secondary cell is configured or activated by the higher layers. Here, the terminal device 1 may be a terminal device 1 that supports aggregating more than five serving cells with frame structure type 1.

A UE that supports aggregating more than one serving cell with frame structure type 2 may be configured by the higher layers to use either PUCCH format 1b with channel selection or PUCCH format 3 for transmission of HARQ-ACK when configured with more than one serving cell with frame structure type 2. In other words, the base station device 3 may configure, by using the higher layer signaling, for the terminal device 1, to use either PUCCH format 1b with channel selection or PUCCH format 3.

A UE that supports aggregating more than 5 serving cells with frame structure type 2 may be configured by the higher layers to use any one of PUCCH format 1b with channel selection, PUCCH format 3, or PUCCH format 4 for transmission of HARQ-ACK when configured with more than one serving cell with frame structure type 2. In other words, the base station device 3 may configure, by using the higher layer signaling, for the terminal device 1, to use any one of PUCCH format 1b with channel selection, PUCCH format 3, or PUCCH format 4.

Here, the terminal device 1 may be configured by the higher layers to use any one of PUCCH format 1b with channel selection, PUCCH format 3, or PUCCH format 4 for transmission of HARQ-ACK when configured with more than five serving cells with frame structure type 2. The terminal device 1 may be configured by the higher layers to use any one of PUCCH format 1b with channel selection, PUCCH format 3, or PUCCH format 4 for transmission of HARQ-ACK when more than five serving cells with frame structure type 2 are activated. The terminal device 1 may be configured by the higher layers to use any one of PUCCH format 1b with channel selection, PUCCH format 3, and PUCCH format 4 for transmission of HARQ-ACK when the PUCCH secondary cell is configured or activated by higher layers. Here, the terminal device 1 may be a terminal device 1 that supports aggregating more than five serving cells with frame structure type 2.

Here, the base station device 3 may configure, by using the higher layer signaling, for the terminal device 1, to use any one of PUCCH format 1b with channel selection, PUCCH format 3, or PUCCH format 4, per PUCCH cell group including more than one serving cell. The terminal device 1 may be configured for transmission of HARQ-ACK by the higher layer to use any one of PUCCH format 1b with channel selection, PUCCH format 3, or PUCCH format 4, per PUCCH cell group including more than one serving cell.

Here, the PUCCH cell groups may be individually configured for each of the PUCCH formats. To be more specific, the terminal device 1 may transmit, in the PUCCH cell group configured for each of the PUCCH formats, uplink control information with the corresponding PUCCH format. Here, a common PUCCH cell group may be configured for multiple PUCCH formats.

For example, a PUCCH cell group may be configured for PUCCH format 1. A PUCCH cell group for PUCCH format 1a, PUCCH format 1b, PUCCH format 3 and/or PUCCH format 4 may be configured. A PUCCH cell group for PUCCH format 2, PUCCH format 2a, and/or PUCCH format 2b may be configured. Here, a PUCCH cell group may be configured only for PUCCH format 1a, PUCCH format 1b, PUCCH format 3 and/or PUCCH format 4 without configuring a PUCCH cell group for PUCCH format 1, PUCCH format 2, PUCCH format 2a and/or PUCCH format 2b.

Here, the base station device 3 may configure one or multiple serving cells through higher layer signaling. For example, one or multiple secondary cells may be configured to form a set of multiple serving cells with a primary cell. Here, the serving cells configured by the base station device 3 may include a PUCCH secondary cell.

The base station device 3 may activate or deactivate one or multiple serving cells by using the higher layer signaling (for example, a MAC control element). For example, the activation or deactivation mechanism may be based on a combination of the MAC control element and a deactivation timer.

Here, secondary cells activated or deactivated by the base station device 3 may include a PUCCH secondary cell. To be more specific, the base station device 3 may solely activate or deactivate multiple secondary cells including the PUCCH secondary cell by using a single activation/deactivation command. In other words, the base station device 3 may transmit the single activation/deactivation command to be used to activate or deactivate secondary cells by using the MAC control element.

As a value of the deactivation timer, a common value may be configured for each terminal device 1 by higher layers (for example, the RRC layer). The deactivation timer (the value of the timer) may be maintained for (apply to) each of the secondary cells. Here, the deactivation timer (the value of the timer) may be maintained for each of the non-PUCCH secondary cells only. In other words, the terminal device 1 may maintain (apply) the deactivation timer for (to) each of the non-PUCCH secondary cells only, without applying the deactivation timer to the PUCCH secondary cells.

Alternatively, a deactivation timer for PUCCH secondary cells and a deactivation timer for non-PUCCH secondary cells may be configured separately. For example, the base station device 3 may transmit the higher layer signaling including the deactivation timer for the PUCCH secondary cells. Moreover, the base station device 3 may transmit the higher layer signaling including the deactivation timer for the non-PUCCH secondary cells.

Here, the base station device 3 may indicate (configure or allocate) a PUCCH resource. Here, the PUCCH resource may include a first PUCCH resource (also referred to as n(1)PUCCH), a second PUCCH resource (also referred to as n(2)PUCCH), a third PUCCH resource (also referred to as n(3)PUCCH), and a fourth PUCCH resource (also referred to as n(4)PUCCH).

For example, the base station device 3 may transmit the higher layer signaling including first information to be used to configure the first PUCCH resource. For example, SR may be transmitted on the first PUCCH resource. The base station device 3 may transmit higher layer signaling including second information to be used to indicate periodicity and/or offset for transmission of SR. The terminal device 1 may transmit SR in accordance with a configuration made by the base station device 3. To be more specific, the terminal device 1 may transmit SR by using the first PUCCH resource and the first PUCCH format.

The base station device 3 may indicate the first PUCCH resource by using the higher layer signaling and the PDCCH. For example, the base station device 3 may transmit the higher layer signaling including third information to be used to configure the first PUCCH resource. For example, HARQ-ACK corresponding to the second PUCCH format may be transmitted on the first PUCCH resource. The terminal device 1 may determine the first PUCCH resource on the basis of the control channel element (CCE) used for the transmission of the PDCCH (for example, the lowest index of the CCE) and the third information. The terminal device 1 may use the first PUCCH resource for the transmission of HARQ-ACK corresponding to the second PUCCH format. To be more specific, the terminal device 1 may transmit HARQ-ACK by using the first PUCCH resource and the second PUCCH format.

The base station device 3 may transmit the higher layer signaling including fourth information to be used to configure the second PUCCH resource. For example, CSI (for example, periodic CSI) may be transmitted on the second PUCCH resource. Here, the second PUCCH resource may be configured for each of the serving cells. In other words, CSI (for example, CSI) may be reported for each of the serving cells. The base station device 3 may transmit the higher layer signaling including fifth information to be used to indicate periodicity and/or offset for a periodic CSI report. The terminal device 1 may periodically report CSI in accordance with a configuration made by the base station device 3. To be more specific, the terminal device 1 may report periodic CSI by using the second PUCCH resource and the third PUCCH format.

The base station device 3 may indicate the third PUCCH resource by using the higher layer signaling and the PDCCH (or downlink control information transmitted on the PDCCH). For example, the base station device 3 may transmit sixth information for configuring four values associated with the third PUCCH resource (four third PUCCH resources) by using the higher layer signaling and further indicate one of the third PUCCH resources on the basis of the value set in the downlink control information transmitted on the PDCCH corresponding to the non-PUCCH serving cell (for example, by indicating one of the four configured values by using "00", "01", "10", or "11" set in the 2-bit information field).

For example, the base station device 3 may indicate one of the third PUCCH resources by using the value set in the transmit power command field for the PUCCH included in a downlink assignment transmitted on the PDCCH for the non-PUCCH serving cell. For example, HARQ-ACK, SR, and/or CSI (for example, periodic CSI) corresponding to the fourth PUCCH format may be transmitted with the third PUCCH resource. The terminal device 1 may transmit HARQ-ACK, SR, and/or CSI (for example, periodic CSI) corresponding to the fourth PUCCH format with the third PUCCH resource in the fourth PUCCH format.

The base station device 3 may configure a fourth PUCCH resource by using the higher layer signaling and/or the PDCCH (or downlink control information transmitted on the PDCCH). For example, the base station device 3 may transmit the higher layer signaling including seventh information to be used to configure the fourth PUCCH resource. The base station device 3 may indicate the fourth PUCCH resource in association with the PDCCH. The terminal device 1 may determine the fourth PUCCH resource in accordance with the PDCCH. The base station device 3 may transmit, on the PDCCH, downlink control information to be used to indicate the fourth PUCCH resource. For example, the base station device 3 may indicate one of fourth PUCCH resources by using the value set in the transmit power command field for the PUCCH included in a downlink assignment transmitted on the PDCCH for the non-PUCCH serving cell.

The base station device 3 may transmit eighth information to be used to indicate the fourth PUCCH resource with the information included in the above-described single command (or MAC control element) to be used to activate or deactivate a serving cell. For example, the base station device 3 may indicate the fourth PUCCH resource by using the single command to be used to activate or deactivate at least a PUCCH secondary cell.

The terminal device 1 may determine the fourth PUCCH resource in accordance with the eighth information included in the single command (or MAC control element) to be used to activate or deactivate a serving cell. Here, the terminal device 1 may transmit, on the PUSCH and/or the PUCCH, HARQ-ACK for downlink data (transmission on the PDSCH) including the single command to be used to indicate the fourth PUCCH resource. For example, the terminal device 1 may transmit HARQ-ACK at least for downlink data (transmission on the PDSCH) including the single command to be used to activate or deactivate the PUCCH secondary cell. Here, the terminal device 1 does not need to transmit HARQ-ACK for downlink data (transmission on the PDSCH) including a single command to be used to activate or deactivate a secondary cell not including a PUCCH secondary cell.

For example, HARQ-ACK, SR, and/or CSI (for example, periodic CSI) corresponding to the fifth PUCCH format may be transmitted on the fourth PUCCH resource. The terminal device 1 may transmit HARQ-ACK, SR, and/or CSI (for example, periodic CSI) corresponding to the fifth PUCCH format by using the fourth PUCCH resource and the fifth PUCCH format.

The base station device 3 may further transmit ninth information (also referred to as ServcellIndex) to be used to identify a serving cell. For example, the base station device 3 may transmit the ninth information with the information included in any of the higher layer signaling and/or the PDCCH (or downlink control information transmitted on the PDCCH).

For example, the base station device 3 may transmit the higher layer signaling including the first information, the second information, and/or the ninth information. In other words, the base station device 3 may indicate (configure) a PUCCH serving cell (for example, the primary cell and/or the PUCCH secondary cell) to be used for transmission of SR. The base station device 3 may indicate (configure) a PUCCH serving cell in which the first PUCCH resource to be used for transmission of SR is configured. In other words, the base station device may indicate (configure) a serving cell in which the first PUCCH format is to be used. In other words, the ninth information may be configured for the first PUCCH format. The terminal device 1 may transmit SR on the PUCCH in the PUCCH serving cell (for example, the primary cell and/or the PUCCH secondary cell) in accordance with the first information, the second information, and/or the ninth information.

For example, the base station device 3 may transmit the higher layer signaling including the third information and/or the ninth information. In other words, the base station device 3 may indicate (configure) a PUCCH serving cell (for example, the primary cell and/or the PUCCH secondary cell) to be used for transmission of HARQ-ACK corresponding to the second PUCCH format. The base station device 3 may indicate (configure) a PUCCH serving cell in which the first PUCCH resource to be used for HARQ-ACK corresponding to the second PUCCH format is configured. In other words, the base station device may indicate (configure) a serving cell in which the second PUCCH format is to be used. In other words, the ninth information may be configured for the second PUCCH format. The terminal device 1 may transmit HARQ-ACK on the PUCCH in the PUCCH serving cell (for example, the primary cell and/or the PUCCH secondary cell) in accordance with the third information, the ninth information, and/or the CCE used for transmission of the PDCCH.

For example, the base station device 3 may transmit the higher layer signaling including the fourth information, the fifth information, and/or the ninth information. In other words, the base station device 3 may indicate (configure) a PUCCH serving cell (for example, the primary cell and/or the PUCCH secondary cell) to be used for transmission of CSI (for example, periodic CSI). The base station device 3 may indicate (configure) a PUCCH serving cell in which the second PUCCH resource to be used for transmission of CSI (for example, periodic CSI) is configured. In other words, the base station device may indicate (configure) the serving cell in which the third PUCCH format is to be used. In other words, the ninth information may be configured for the third PUCCH format. The terminal device 1 may transmit periodic CSI on the PUCCH in the PUCCH serving cell (for example, the primary cell and/or the PUCCH secondary cell) in accordance with the fourth information, the fifth information, and/or the ninth information.

For example, the base station device 3 may transmit the higher layer signaling including the sixth information and/or the ninth information. In other words, the base station device 3 may indicate (configure) a PUCCH serving cell (for example, the primary cell and/or the PUCCH secondary cell) to be used for transmission of HARQ-ACK corresponding to the fourth PUCCH format. The base station device 3 may indicate (configure) a PUCCH serving cell in which the third PUCCH resource to be used for HARQ-ACK corresponding to the fourth PUCCH format is configured. In other words, the base station device may indicate (configure) a serving cell in which the fourth PUCCH format is to be used. In other words, the ninth information may be configured for the fourth PUCCH format. The terminal device 1 may transmit HARQ-ACK, CSI, and/or SR on the PUCCH in the PUCCH serving cell (for example, the primary cell and/or the PUCCH secondary cell) in accordance with the sixth information, the ninth information, and/or the value set in the downlink control information transmitted on the PDCCH.

For example, the base station device 3 may transmit the higher layer signaling including the seventh information, the eighth information, and/or the ninth information. In other words, the base station device 3 may indicate (configure) a PUCCH serving cell (for example, the primary cell and/or the PUCCH secondary cell) to be used for transmission of HARQ-ACK corresponding to the fifth PUCCH format. The base station device 3 may indicate (configure) a PUCCH serving cell in which the fourth PUCCH resource to be used for HARQ-ACK corresponding to the fifth PUCCH format is configured. In other words, the base station device may indicate (configure) the serving cell in which the fifth PUCCH format is to be used. In other words, the ninth information may be configured for the fifth PUCCH format. The terminal device 1 may transmit HARQ-ACK, SR, and/or CSI on the PUCCH in the PUCCH serving cell (for example, the primary cell and/or the PUCCH secondary cell) in accordance with the seventh information, the eighth information, and/or the ninth information.

Here, the ninth information may be configured only for the first PUCCH format. In other words, the ninth information may be configured only for transmission of SR. In other words, the base station device 3 may instruct the terminal device 1 to transmit SR only in the primary cell. Alternatively, the base station device 3 may instruct the terminal device 1 to transmit SR only in the PUCCH secondary cell. To be more specific, the terminal device 1 may transmit SR in any one of the PUCCH serving cells in accordance with the ninth information even when transmission on the PUCCH in the primary cell and transmission on the PUCCH in the PUCCH secondary cell have been configured. In other words, the first PUCCH format (or transmission of SR) may be defined for each terminal device 1 (per UE). Here, as described above, a PUCCH cell group (per PUCCH cell group) may be configured for the first PUCCH format (or transmission of SR).

The ninth information may be configured only for the third PUCCH format. In other words, the ninth information may be configured only for transmission of CSI (for example, periodic CSI). In other words, the base station device 3 may instruct the terminal devices 1 to transmit CSI (for example, periodic CSI) only in the primary cell. The base station device 3 may instruct the terminal devices 1 to transmit CSI (for example, periodic CSI) only in the PUCCH secondary cell. To be more specific, the terminal device 1 may transmit CSI (for example, periodic CSI) in any one of the PUCCH serving cells in accordance with the ninth information even when transmission on the PUCCH in the primary cell and transmission on the PUCCH in the PUCCH secondary cell have been configured. In other words, the third PUCCH format (or a periodic CSI report) may be defined for each terminal device 1 (per UE). Here, as described above, a PUCCH cell group (per PUCCH cell group) may be configured for the third PUCCH format (a periodic CSI report).

The ninth information may be configured only for the first PUCCH format and the third PUCCH format. In other words, the ninth information may be configured only for transmission of SR and transmission of CSI (for example, periodic CSI). In other words, the base station device 3 may instruct the terminal device 1 to transmit SR and CSI (for example, periodic CSI) only in the primary cell. The base station device 3 may make an instruction to transmit SR and CSI (for example, periodic CSI) only in the PUCCH secondary cell. To be more specific, the terminal device 1 may transmit SR and CSI (for example, periodic CSI) in any one of the PUCCH serving cells in accordance with the ninth information even when transmission on the PUCCH in the primary cell and transmission on the PUCCH in the PUCCH secondary cell have been configured. In other words, the first PUCCH format (transmission of SR) and the third PUCCH format (or a periodic CSI report) may be defined for each of the terminal devices 1 (per UE).

In other words, as described above, a PUCCH cell group may be configured only for the second PUCCH format, the fourth PUCCH format, and the fifth PUCCH format.

Figure 4:
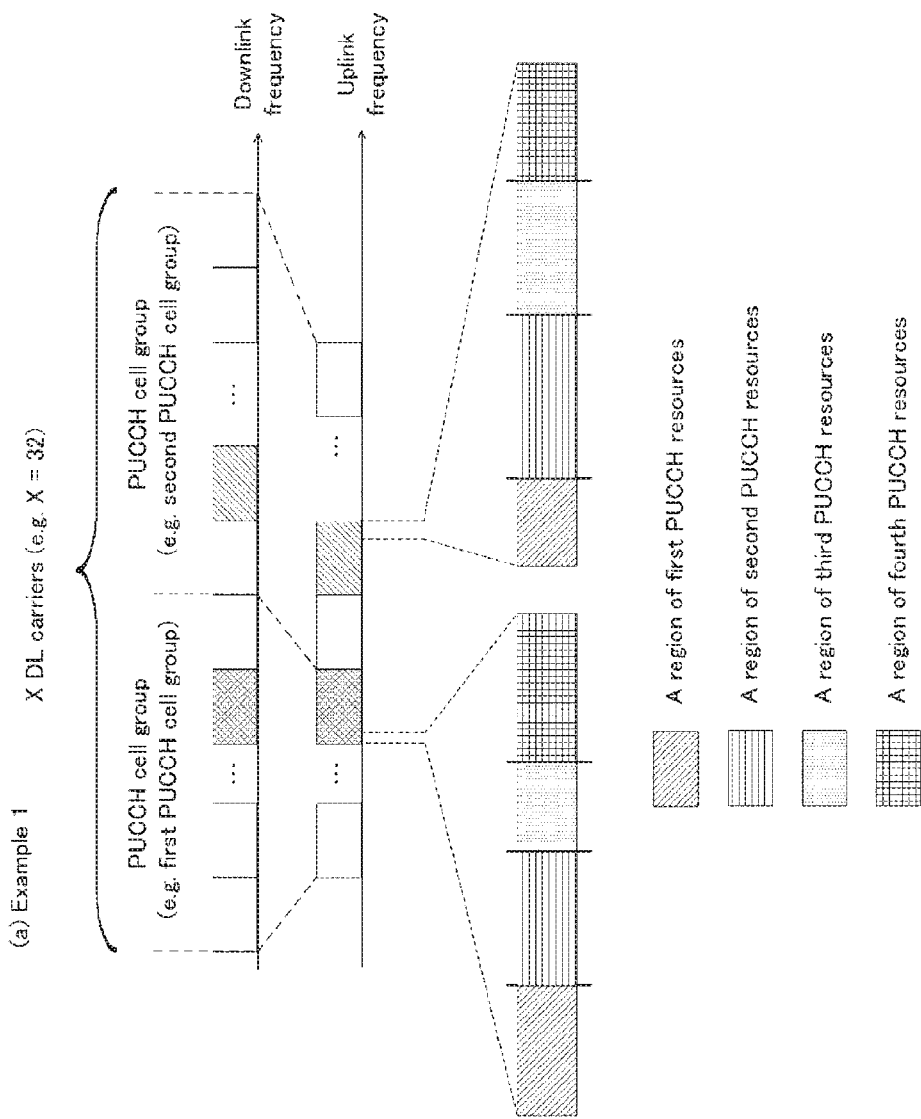
FIG. 4 is a diagram for illustrating a method of transmitting HARQ-ACK according to the present embodiment.

FIG. 4 is a diagram for illustrating a method of transmitting HARQ-ACK according to the present embodiment.

The operations, which will be described below with reference to FIG. 4, may be performed for each PUCCH cell group. To be more specific, the base station device 3 and the terminal device 1 may perform the operations, which will be described with reference to FIG. 4, in one PUCCH cell group. In the description referring to FIG. 4, configuring more than one serving cell may indicate configuring more than one and up to five serving cells.

Hereinafter, a subframe in which detection of a PDCCH and transmission (decoding) on a PDSCH based on the detection of the PDCCH are performed, is also referred to as a first subframe. For example, the first subframe is represented as subframe n−4. Moreover, a subframe in which transmission of HARQ-ACK for transmission (decoding) on the PDSCH is also referred to as a second subframe. For example, the second subframe is represented as subframe n.

As described above, the terminal device 1 may use the first PUCCH resource and the second PUCCH format for the transmission of HARQ-ACK in the second subframe. Alternatively, the terminal device 1 may use the third PUCCH resource and the fourth PUCCH format for the transmission of HARQ-ACK in the second subframe. Alternatively, the terminal device 1 may use the fourth PUCCH resource and the fifth PUCCH format for the transmission of HARQ-ACK in the second subframe.

For example, when one serving cell is configured, the terminal device 1 may use the first PUCCH resource and the second PUCCH format for the PDSCH transmission indicated by the detection of the PDCCH in the first subframe.

When more than one serving cell is configured, the terminal device 1 may use the first PUCCH resource and the second PUCCH format for the PDSCH transmission only on the primary cell indicated by the detection of the PDCCH in the first subframe.

When more than one serving cell is configured, the terminal device 1 may use the first PUCCH resource and the second PUCCH format for the PDSCH transmission only on the PUCCH secondary cell indicated by the detection of the PDCCH in the first subframe.

Here, when more than one serving cell is configured, the terminal device 1 may use the third PUCCH resource and the fourth PUCCH format, or the fourth PUCCH resource and the fifth PUCCH format for the PDSCH transmission only on the PUCCH secondary cell indicated by the detection of the PDCCH in the first subframe. As described above, the base station device 3 may configure (indicate) which of the fourth PUCCH format (PUCCH format 3) and the fifth PUCCH format (PUCCH format 4) is to be used.

In other words, in a configuration where more than one serving cell is configured, when the PDSCH transmission on at least one PUCCH secondary cell is indicated by the detection of the PDCCH in the first subframe, the terminal device 1 may use the third PUCCH resource and the fourth PUCCH format, or the fourth PUCCH resource and the fifth PUCCH format.

In the configuration where more than one serving cell is configured, the terminal device 1 may use the third PUCCH resource and the fourth PUCCH format, or the fourth PUCCH resource and the fifth PUCCH format, for the transmission on the PDSCH in the non-PUCCH secondary cell indicated by detection of the PDCCH in the first subframe.

In other words, in the configuration where more than one serving cell is configured, when the PDSCH transmission on at least one non-PUCCH secondary cell is indicated by the detection of the PDCCH in the first subframe, the terminal device 1 may use the third PUCCH resource and the fourth PUCCH format, or the fourth PUCCH resource and the fifth PUCCH format.

In other words, the terminal device 1 may use the first PUCCH resource and the second PUCCH format for the PDSCH transmission only on the primary cell. The terminal device 1 may use the third PUCCH resource and the fourth PUCCH format, or the fourth PUCCH resource and the fifth PUCCH format, for the PDSCH transmission only on the PUCCH secondary cell. In other words, the terminal device 1 may use a different PUCCH resource and a different PUCCH format for the PDSCH transmission only on the PUCCH serving cell, depending on in which PUCCH serving cell (the primary cell or the PUCCH secondary cell) the PDSCH transmission is performed.

Here, in a configuration where more than one serving cell is configured, the terminal device 1 may use the first PUCCH resource configured by the higher layers (also referred to as a first PUCCH resource (1) below) for the transmission of HARQ-ACK for the PDSCH transmission only on the PUCCH secondary cell. For example, the base station device 3 may transmit the higher layer signaling including tenth information to be used to configure the first PUCCH resource (1).

To be more specific, the terminal device 1 may transmit HARQ-ACK for the PDSCH transmission only on the PUCCH secondary cell, on a first PUCCH resource (the first PUCCH resource (1)) different from the first PUCCH resource used for the transmission of HARQ-ACK for the PDSCH transmission only on the primary cell. Here, for example, the different first PUCCH resource may indicate a PUCCH resource having a resource index different from the resource index for the first PUCCH resource, a different orthogonal sequence index, and/or a different cyclic shift value.

In a configuration where more than five serving cells are configured or activated, the terminal device 1 may use the first PUCCH resource and the second PUCCH format for the PDSCH transmission only on the primary cell indicated by detection of the PDCCH in the first subframe. Here, in the configuration where more than five serving cells are configured or activated, the terminal device 1 may use the first PUCCH resource (1) and the second PUCCH format for the PDSCH transmission only on the primary cell indicated by the detection of the PDCCH in the first subframe.

In the configuration where more than five serving cells are configured or activated, the terminal device 1 may use the first PUCCH resource and the second PUCCH format for the PDSCH transmission only on the PUCCH secondary cell indicated by the detection of the PDCCH in the first subframe. In the configuration where more than five serving cells are configured or activated, the terminal device 1 may use the first PUCCH resource (1) and the second PUCCH format for the PDSCH transmission only on the PUCCH secondary cell indicated by the detection of the PDCCH in the first subframe. Here, the first PUCCH resource (1) may be a resource in the PUCCH secondary cell.

In the configuration where more than five serving cells are configured or activated, the terminal device 1 may use the fourth PUCCH resource and the fifth PUCCH format for the PDSCH transmission only on the PUCCH secondary cell indicated by the detection of the PDCCH in the first subframe.

In other words, in the configuration where more than five serving cells are configured or activated, when the PDSCH transmission on at least one PUCCH secondary cell is indicated by the detection of the PDCCH in the first subframe, the terminal device 1 may use the fourth PUCCH resource and the fifth PUCCH format.

In the configuration where more than five serving cells are configured or activated, the terminal device 1 may use the fourth PUCCH resource and the fifth PUCCH format for the PDSCH transmission only on the non-PUCCH secondary cell indicated by the detection of the PDCCH in the first subframe.

In other words, in the configuration where more than five serving cells are configured or activated, when the PDSCH transmission on at least one non-PUCCH secondary cell is indicated by the detection of the PDCCH in the first subframe, the terminal device 1 may use the fourth PUCCH resource and the fifth PUCCH format.

Here, in a configuration where cell groups (for example, a master cell group, a secondary cell group) associated with a dual connectivity are configured, the terminal device 1 may use the first PUCCH resource and the second PUCCH format for the PDSCH transmission only on the primary secondary cell indicated by the detection of the PDCCH in the first subframe. In the present embodiment, the secondary cell does not include a primary secondary cell. The master cell group may include one or multiple PUCCH cell groups. The secondary cell group may include one or multiple PUCCH cell groups.

In the configuration where cell groups associated with the dual connectivity are configured, the terminal device 1 may use the third PUCCH resource and the fourth PUCCH format, or the fourth PUCCH resource and the fifth PUCCH format, for the PDSCH transmission only on the secondary cell (the PUCCH secondary cell and/or the non-PUCCH secondary cell) indicated by the detection of the PDCCH in the first subframe.

Here, in the dual connectivity, the terminal device 1 may (simultaneously) connect to a master eNB (MeNB) and a secondary eNB (SeNB). In a configuration where the dual connectivity is configured, two MAC entities may be configured for the terminal device 1. Here, one of the two MAC entities may indicate a MAC entity for the master cell group. The other of the two MAC entities may indicate a MAC entity for the secondary cell group. In a configuration where the dual connectivity is not configured, one MAC entity may be configured for the terminal device 1.

Here, the terminal device 1 configured to transmit HARQ-ACK by using the fourth PUCCH format may determine the number of HARQ-ACK bits, at least on the basis of the number of configured serving cells and the downlink transmission mode configured for each of the configured serving cells. The terminal device 1 configured to transmit HARQ-ACK by using the fifth PUCCH format may determine the number of HARQ-ACK bits, at least on the basis of the number of configured or activated serving cells and the downlink transmission mode configured for each of the configured or activated serving cells.

For example, the terminal device 1 may use HARQ-ACK bit constituted of two bits for a serving cell configured to be in a downlink transmission mode that supports up to two transport blocks, and use HARQ-ACK bit constituted of one bit, otherwise (for example, for a serving cell configured to be in a downlink transmission mode that supports one transport block).

Here, as described above, the terminal device 1 may simultaneously transmit HARQ-ACK and CSI by using the third PUCCH format, the fourth PUCCH format, and the fifth PUCCH format. Here, for example, the base station device 3 can transmit the higher layer signaling including eleventh information to be used to allow simultaneous transmission of HARQ-ACK and CSI (simultaneousAckNackAndCQI). Here, the eleventh information may be used to allow simultaneous transmission of HARQ-ACK and CSI in the third PUCCH format.

The base station device 3 can transmit the higher layer signaling including twelfth information to be used to allow simultaneous transmission of HARQ-ACK and CSI (simultaneousAckNackAndCQI-Format3) by using the fourth PUCCH format. The base station device 3 can transmit the higher layer signaling including thirteenth information to be used to allow simultaneous transmission of HARQ-ACK and CSI (simultaneousAckNackAndCQI-Format4) by using the fifth PUCCH format.

For example, the base station device 3 may transmit, to the terminal device 1, the eleventh information, the twelfth information, and/or the thirteenth information for each of the PUCCH cell groups by using the higher layer signaling. The terminal device 1 may receive, from the base station device 3, the eleventh information, the twelfth information, and/or the thirteenth information for each of the PUCCH cell groups by using the higher layer signaling.

The base station device 3 may transmit, to the terminal device 1, information common to multiple PUCCH cell groups (the eleventh information, the twelfth information, and/or the thirteenth information) by using the higher layer signaling. The terminal device 1 may receive, from the base station device 3, information common to multiple PUCCH cell groups (the eleventh information, the twelfth information, and/or the thirteenth information) by using the higher layer signaling.

The base station device 3 may transmit, to the terminal device 1, the eleventh information, the twelfth information, and/or the thirteenth information for each of the PUCCH serving cells by using the higher layer signaling. The terminal device 1 may receive, from the base station device 3, the eleventh information, the twelfth information, and/or the thirteenth information for each of the PUCCH serving cells by using the higher layer signaling.

The base station device 3 may transmit, to the terminal device 1, information common to multiple PUCCH serving cells (the eleventh information, the twelfth information, and/or the thirteenth information) by using the higher layer signaling. The terminal device 1 may receive, from the base station device 3, information common to multiple PUCCH serving cells (the eleventh information, the twelfth information, and/or the thirteenth information) by using the higher layer signaling.

The base station device 3 may transmit, to the terminal device 1, the eleventh information, the twelfth information, and/or the thirteenth information for each of the master cell group and the secondary cell group by using the higher layer signaling. The terminal device 1 may receive, from the base station device 3, the eleventh information, the twelfth information, and/or the thirteenth information for each of the master cell group and the secondary cell group by using the higher layer signaling.

Here, in a case that a CSI report (for example, periodic CSI) and HARQ-ACK collide in the same subframe without any PUSCH, the terminal device 1 for which one serving cell is configured and the fourth PUCCH format and/or the fifth PUCCH format is not configured may report CSI multiplexed with HARQ-ACK on the PUCCH by using the third PUCCH format at least under the condition that simultaneous transmission of HARQ-ACK and CSI is allowed in accordance with the eleventh information. Here, HARQ-ACK and CSI may be transmitted simultaneously on the second PUCCH resource.

In a case that a CSI report (for example, periodic CSI) and HARQ-ACK collide in the same subframe without any PUSCH, the terminal device 1 for which more than one serving cell is configured may report CSI multiplexed with HARQ-ACK on the PUCCH by using the third PUCCH format at least under the conditions that simultaneous transmission of HARQ-ACK and CSI is allowed in accordance with the eleventh information and that HARQ-ACK is corresponding to the PDSCH transmission only on the primary cell. Here, HARQ-ACK and CSI may be transmitted simultaneously on the second PUCCH resource.

Here, HARQ-ACK corresponding to the PDSCH transmission only on the primary cell may indicate that the terminal device 1 transmits HARQ-ACK for the PDSCH transmission only on the primary cell. In other words, in this configuration, the terminal device 1 may receive the PDSCH transmission only on the primary cell.

In a case that a CSI report (for example, periodic CSI) and HARQ-ACK collide in the same subframe without any PUSCH, the terminal device 1 for which more than one serving cell is configured may report CSI multiplexed with HARQ-ACK on the PUCCH in the third PUCCH format at least under the conditions that simultaneous transmission of HARQ-ACK and CSI is allowed in accordance with the eleventh information and that HARQ-ACK is corresponding to the PDSCH transmission only on the PUCCH secondary cell. Here, HARQ-ACK and CSI may be transmitted simultaneously on the second PUCCH resource.

Here, HARQ-ACK corresponding to the PDSCH transmission only on the PUCCH secondary cell may indicate that the terminal device 1 transmits HARQ-ACK for the PDSCH transmission only on the PUCCH secondary cell. In other words, in this configuration, the terminal device 1 may receive the PDSCH transmission only on the PUCCH secondary cell.

Here, in a case that a CSI report (for example, periodic CSI) and HARQ-ACK collide in the same subframe without any PUSCH, the terminal device 1 for which more than one serving cell and the fourth PUCCH format are configured may report CSI multiplexed with HARQ-ACK on the PUCCH by using the fourth PUCCH format at least under the conditions that simultaneous transmission of HARQ-ACK and CSI is allowed in accordance with the twelfth information and that HARQ-ACK is corresponding to the PDSCH transmission only on the PUCCH secondary cell. Here, HARQ-ACK and CSI may be transmitted simultaneously on the third PUCCH resource.

In a case that a CSI report (for example, periodic CSI) and HARQ-ACK collide in the same subframe without any PUSCH, the terminal device 1 for which more than one serving cell and the fifth PUCCH format are configured may report CSI multiplexed with HARQ-ACK on the PUCCH by using the fifth PUCCH format at least under the conditions that simultaneous transmission of HARQ-ACK and CSI is allowed in accordance with the thirteenth information and that HARQ-ACK is corresponding to the PDSCH transmission only on the PUCCH secondary cell. Here, HARQ-ACK and CSI may be transmitted simultaneously on the fourth PUCCH resource.

In a case that a CSI report (for example, periodic CSI) and HARQ-ACK collide in the same subframe without any PUSCH, the terminal device 1 for which more than one serving cell and the fourth PUCCH format are configured may report CSI multiplexed with HARQ-ACK on the PUCCH by using the fourth PUCCH format at least under the conditions that simultaneous transmission of HARQ-ACK and CSI is allowed in accordance with the twelfth information and that HARQ-ACK is corresponding to the PDSCH transmission on the non-PUCCH secondary cell. For example, the terminal device 1 may report CSI multiplexed with HARQ-ACK on the PUCCH by using the fourth PUCCH format under the condition that the total number of bits corresponding to the uplink control information (HARQ-ACK, SR (if any), and/or CSI) in the subframe is less than a predetermined value (for example, 22 bits). Here, HARQ-ACK and CSI may be transmitted simultaneously on the third PUCCH resource.

Here, HARQ-ACK corresponding to the PDSCH transmission on the non-secondary cell may indicate that the terminal device 1 transmits HARQ-ACK for the PDSCH transmission on at least one non-PUCCH secondary cell. In other words, in this configuration, the terminal device 1 may receive the PDSCH transmission on at least one non-PUCCH secondary cell.

In a case that a CSI report (for example, periodic CSI) and HARQ-ACK collide in the same subframe without any PUSCH, the terminal device 1 for which more than one serving cell and the fifth PUCCH format are configured may report CSI multiplexed with HARQ-ACK on the PUCCH by using the fifth PUCCH format at least under the conditions that simultaneous transmission of HARQ-ACK and CSI is allowed in accordance with the thirteenth information and that HARQ-ACK is corresponding to the PDSCH transmission on the non-PUCCH secondary cell. For example, the terminal device 1 may report CSI multiplexed with HARQ-ACK on the PUCCH by using the fifth PUCCH format under the condition that the total number of bits corresponding to the uplink control information in the subframe is less than a predetermined value (for example, the number of bits transmitted in PUCCH format 5). Here, HARQ-ACK and CSI may be transmitted simultaneously on the fourth PUCCH resource.

In other words, the terminal device 1 may use the third PUCCH format when HARQ-ACK is corresponding to the PDSCH transmission only on the primary cell. The terminal device 1 may use the third PUCCH format or the fourth PUCCH format when HARQ-ACK is corresponding to the PDSCH transmission only on the PUCCH secondary cell. The terminal device 1 may use the third PUCCH format or the fifth PUCCH format when HARQ-ACK is corresponding to the PDSCH transmission only on the PUCCH secondary cell.

In other words, the terminal device 1 may use different PUCCH resources and different PUCCH formats for simultaneous transmission of HARQ-ACK and CSI depending on in which PUCCH serving cell (the primary cell or the PUCCH secondary cell) HARQ-ACK is for the PDSCH transmission.

Here, in a case that more than one serving cell is configured, the terminal device 1 may use the second PUCCH resource configured by the higher layers (also referred to as a second PUCCH resource (1) below) for the transmission of CSI and HARQ-ACK for the PDSCH transmission only on the PUCCH secondary cell. For example, the base station device 3 may transmit the higher layer signaling including fourteenth information to be used to configure the second PUCCH resource (1).

To be more specific, the terminal device 1 may transmit CSI and HARQ-ACK for the PDSCH transmission only on the PUCCH secondary cell, with a second PUCCH resource (the second PUCCH resource (1)) different from the second PUCCH resource used for the transmission of CSI and HARQ-ACK for the PDSCH transmission only on the primary cell. Here, for example, the different second PUCCH resource may indicate a PUCCH resource having a resource index different from the resource index of the second PUCCH resource, a different orthogonal sequence index, and/or a different cyclic shift value.

In a case that a CSI report (for example, periodic CSI) and HARQ-ACK collide in the same subframe without any PUSCH, the terminal device 1 for which more than five serving cells are configured or activated may report CSI multiplexed with HARQ-ACK on the PUCCH by using the third PUCCH format at least under the conditions that simultaneous transmission of HARQ-ACK and CSI is allowed in accordance with the eleventh information and that HARQ-ACK is corresponding to the PDSCH transmission only on the primary cell. Here, HARQ-ACK and CSI may be transmitted simultaneously on the second PUCCH resource. Alternatively, HARQ-ACK and CSI may be transmitted simultaneously on the second PUCCH resource (1).

In a case that a CSI report (for example, periodic CSI) and HARQ-ACK collide in the same subframe without any PUSCH, the terminal device 1 for which more than five serving cells are configured or activated may report CSI multiplexed with HARQ-ACK on the PUCCH by using the third PUCCH format at least under the conditions that simultaneous transmission of HARQ-ACK and CSI is allowed in accordance with the eleventh information and that HARQ-ACK is corresponding to the PDSCH transmission only on the PUCCH secondary cell. Here, HARQ-ACK and CSI may be transmitted simultaneously on the second PUCCH resource. Alternatively, HARQ-ACK and CSI may be transmitted simultaneously on the second PUCCH resource (1).

Here, in a case that a CSI report (for example, periodic CSI) and HARQ-ACK collide in the same subframe without any PUSCH, the terminal device 1 for which more than five serving cells are configured or activated and the fourth PUCCH format is configured may report CSI multiplexed with HARQ-ACK on the PUCCH by using the fourth PUCCH format at least under the conditions that simultaneous transmission of HARQ-ACK and CSI is allowed in accordance with the twelfth information and that HARQ-ACK is corresponding to the PDSCH transmission only on the PUCCH secondary cell. Here, HARQ-ACK and CSI may be transmitted simultaneously on the third PUCCH resource.

In a case that a CSI report (for example, periodic CSI) and HARQ-ACK collide in the same subframe without any PUSCH, the terminal device 1 for which more than five serving cells are configured or activated and the fifth PUCCH format is configured may report CSI multiplexed with HARQ-ACK on the PUCCH by using the fifth PUCCH format at least under the conditions that simultaneous transmission of HARQ-ACK and CSI is allowed in accordance with the thirteenth information and that HARQ-ACK is corresponding to the PDSCH transmission only on the PUCCH secondary cell. Here, HARQ-ACK and CSI may be transmitted simultaneously on the fourth PUCCH resource.

In a case that a CSI report (for example, periodic CSI) and HARQ-ACK collide in the same subframe without any PUSCH, the terminal device 1 for which more than five serving cells are configured or activated and the fourth PUCCH format is configured may report CSI multiplexed with HARQ-ACK on the PUCCH by using the fourth PUCCH format at least under the conditions that simultaneous transmission of HARQ-ACK and CSI is allowed in accordance with the twelfth information and that HARQ-ACK is corresponding to the PDSCH transmission on the non-PUCCH secondary cell. For example, the terminal device 1 may report CSI multiplexed with HARQ-ACK on the PUCCH by using the fifth PUCCH format under the condition that the total number of bits corresponding to the uplink control information in the subframe is less than a predetermined value (for example, 22 bits). Here, HARQ-ACK and CSI may be transmitted simultaneously on the third PUCCH resource.

In a case that a CSI report (for example, periodic CSI) and HARQ-ACK collide in the same subframe without any PUSCH, the terminal device 1 for which more than five serving cells are configured or activated and the fifth PUCCH format is configured may report CSI multiplexed with HARQ-ACK on the PUCCH by using the fifth PUCCH format at least under the conditions that simultaneous transmission of HARQ-ACK and CSI is allowed in accordance with the thirteenth information and that HARQ-ACK is corresponding to the PDSCH transmission on the non-PUCCH secondary cell. For example, the terminal device 1 may report CSI multiplexed with HARQ-ACK on the PUCCH by using the fifth PUCCH format under the condition that the total number of bits corresponding to the uplink control information in the subframe is less than a predetermined value (for example, the number of bits transmitted in PUCCH format 5). Here, HARQ-ACK and CSI may be transmitted simultaneously on the fourth PUCCH resource.

As described above, the terminal device 1 may transmit uplink control information in the PUCCH cell group configured for each of the PUCCH formats. To be more specific, in the above description, HARQ-ACK transmitted together with CSI by using the third PUCCH format may be HARQ-ACK for the PUCCH cell group configured for the third PUCCH format (HARQ-ACK for the PDSCH transmission in the PUCCH cell group configured for the third PUCCH format).

Alternatively, in the above description, HARQ-ACK transmitted together with CSI by using the fourth PUCCH format may be HARQ-ACK for the PUCCH cell group configured for the fourth PUCCH format (HARQ-ACK for transmission on the PDSCH in the PUCCH cell group configured for the fourth PUCCH format).

In the above description, HARQ-ACK transmitted together with CSI by using the fifth PUCCH format may be HARQ-ACK for the PUCCH cell group configured for the fifth PUCCH format (HARQ-ACK for the PDSCH transmission in the PUCCH cell group configured for the fifth PUCCH format).

In other words, the terminal device 1 may transmit HARQ-ACK for a different PUCCH cell group together with CSI depending on in which serving cell HARQ-ACK is for transmission on the PDSCH.

In a case that a CSI report and HARQ-ACK collide in the same subframe without any PUSCH in the same PUCCH serving cell, CSI and HARQ-ACK may be transmitted together in accordance with the third PUCCH format, the fourth PUCCH format, and/or the fifth PUCCH format. Here, the PUCCH cell group for HARQ-ACK and the PUCCH cell group for CSI may be different from each other. For example, the PUCCH cell group for HARQ-ACK may be the PUCCH cell group configured for the second PUCCH format, the fourth PUCCH format, and/or the fifth PUCCH format. For example, the PUCCH cell group for CSI may be the PUCCH cell group configured for the second PUCCH format.

In a case that a CSI report in a certain PUCCH serving cell and HARQ-ACK in a PUCCH serving cell different from the certain PUCCH serving cell collide in the same subframe without any PUSCH, CSI in the certain PUCCH serving cell and HARQ-ACK in the PUCCH serving cell different from the certain PUCCH serving cell may be transmitted together. Here, the PUCCH cell group for HARQ-ACK and the PUCCH cell group for CSI may be different from each other. Here, CSI may be transmitted simultaneously by using the third PUCCH format. HARQ-ACK may be transmitted by using the second PUCCH format, the fourth PUCCH format, and/or the fifth PUCCH format.

In a case that a CSI report in a certain PUCCH serving cell and HARQ-ACK in a PUCCH serving cell different from the certain PUCCH serving cell collide in the same subframe without any PUSCH, only HARQ-ACK in the PUCCH serving cell different from the certain PUCCH serving cell may be transmitted. In other words, CSI in the certain PUCCH serving cell may be dropped. Here, the PUCCH cell group for HARQ-ACK and the PUCCH cell group for CSI may be different from each other. CSI may be transmitted by using the second PUCCH format, the fourth PUCCH format, and/or the fifth PUCCH format.

The base station device 3 may transmit the higher layer signaling including information to be used to allow transmission of HARQ-ACK in a certain serving cell and a CSI report in a serving cell different from the certain serving cell in one subframe without any PUSCH (simultaneous PUCCH-PUCCH). In other words, the base station device 3 may transmit information to be used to allow simultaneous transmission of HARQ-ACK on the PUCCH in a certain serving cell and a CSI report on the PUCCH in a serving cell different from the certain serving cell.

FIGS. 5A and 5B are diagrams for illustrating the aperiodic CSI report according to the present embodiment. FIG. 5A illustrates description on a 2-bit CSI request field for a PDCCH with an uplink DCI format in a UE-specific search space. FIG. 5B illustrates description on a 3-bit CSI request field for a PDCCH with an uplink DCI format in a UE-specific search space.

The operations, which will be described below with reference to FIGS. 5A and 5B, may be performed for each PUCCH cell group. To be more specific, the base station device 3 and the terminal device 1 may perform the operations, which will be described with reference to FIGS. 5A and 5B, in one PUCCH cell group. In the description referring to FIGS. 5A and 5B, configuring more than one serving cell may indicate configuring more than one and up to five serving cells.

Here, the base station device 3 may trigger CSI transmission on the PUSCH (also referred to as the aperiodic CSI report) by transmitting information to be used to request transmission of CSI (also referred to as a CSI request) on the PDCCH. For example, the CSI request may be included in an uplink DCI format. The terminal device 1 may perform, based on decoding of the uplink DCI format for a certain serving cell in subframe n, the aperiodic CSI reporting using the PUSCH in subframe n+k in the certain serving cell, in a case that the CSI request field is set to trigger a report.

Here, in a case that the size of the CSI request field is one bit, the aperiodic CSI report may be triggered for a certain serving cell. Here, the aperiodic CSI report being triggered for a certain serving cell indicates the aperiodic CSI report being triggered for the serving cell in which the PUSCH is scheduled by using a DCI format including a CSI request. To be more specific, in a case that the size of the CSI request field is one bit, the terminal device 1 may report CSI for the downlink component carrier corresponding to the uplink component carrier for which the PUSCH is scheduled.

In a case that the size of the CSI request field is two bits, the aperiodic CSI report may be triggered on the basis of the value corresponding to the aperiodic CSI reporting. For example, in a case that the value of the CSI request field is "00", the aperiodic CSI report does not need to be triggered. In a case that the value of the CSI request field is "01", the aperiodic CSI report may be triggered for a certain serving cell. In a case that the value of the CSI request field is "10", the aperiodic CSI report may be triggered for a 1st set of one or more serving cells configured by the higher layers. In a case that the value of the CSI request field is "11", the aperiodic CSI report may be triggered for a 2nd set of one or more serving cells configured by higher layers.

For example, the base station device 3 may transmit the higher layer signaling including information to be used to configure the first set of one or more serving cells (also referred to as trigger1-r10) and information to be used to configure the second set of one or more serving cells (also referred to as trigger2-10). Here, the information to be used to configure the first set (trigger1-r10) and the information to be used to configure the second set (trigger2-r10) may be transmitted with being included in fifteenth information (also referred to as aperiodicCSI-Trigger-r10). In other words, the fifteenth information may indicate for which serving cell(s) the aperiodic CSI report is triggered in a case that the aperiodic CSI report is trigger by a value of 2-bit CSI request field.

The terminal device 1 may perform an aperiodic CSI report on the PUSCH in accordance with the fifteenth information and the value of the CSI request field.

In a case that the size of the CSI request field is three bits, the aperiodic CSI report may be triggered on the basis of the value corresponding to the aperiodic CSI reporting. To be more specific, in a case that the value of the CSI request field is "000", the aperiodic CSI report does not need to be triggered. In a case that the value of the CSI request field is "001", the aperiodic CSI report may be triggered for a certain serving cell. In a case that the value of the CSI request field is "010", the aperiodic CSI report may be triggered for a 1st set of one or more serving cells configured by the higher layers. In a case that the value of the CSI request field is "011", the aperiodic CSI report may be triggered for a 2nd set of one or more serving cells configured by higher layers. Hereinafter, similarly, the serving cell for which the aperiodic CSI report is triggered may be indicated on the basis of the value of the CSI request field.

For example, the base station device 3 may transmit higher layer signaling including information to be used to configure the first set (also referred to as trigger1-r13), information to be used to configure the second set (also referred to as trigger2-r13), information to be used to configure a third set (also referred to as trigger3-r13), information to be used to configure a fourth set (also referred to as trigger4-r13), information to be used to configure a fifth set (also referred to as trigger5-r13), information to be used to configure a sixth set (also referred to as trigger6-r13), and information to be used to configure a seventh set (also referred to as trigger7-r13).

Alternatively, the information to be used to configure the first set (trigger1-r13), the information to be used to configure the second set (trigger2-r13), the information to be used to configure the third set (trigger3-r13), the information to be used to configure the fourth set (trigger4-r13), the information to be used to configure the fifth set (trigger5-r13), the information to be used to configure the sixth set (trigger6-r13), and the information to be used to configure the seventh set (trigger7-r13) may be included in sixteenth information (also referred to as aperiodicCSI-Trigger-r13). In other words, the sixteenth information may indicate for which serving cell(s) the aperiodic CSI report is triggered in a case that the aperiodic CSI report is trigger by a value of 3-bit CSI request field.

In other words, the terminal device 1 may perform aperiodic CSI report on the PUSCH in accordance with the sixteenth information and the value of the CSI request field.

Here, the base station device 3 may transmit, to the terminal device 1, the fifteenth information and/or the sixteenth information for each of the serving cells by using higher layer signaling. The terminal device 1 may receive, from the base station device 3, the fifteenth information and/or the sixteenth information for each of the serving cells by using the higher layer signaling. In other words, the first set to the seventh set may be configured for each of the serving cells with an uplink resource (an uplink component carrier).

Each of the first set to the seventh set may include up to five serving cells.

Here, the maximum number of serving cells each of the first set and the second set can include in accordance with the fifteenth information and the maximum number of serving cells each of the first set to the seventh set can include in accordance with the sixteenth information may be different from each other.

The terminal device 1 may transmit, to the base station device 3, information on the maximum number of serving cells each of the first set and the second set can include in accordance with the fifteenth information. The terminal device 1 may transmit, to the base station device 3, information on the maximum number of serving cells each of the first set to the seventh set can include in accordance with the sixteenth information.

The maximum number of serving cells each of the first set and the second set can include in accordance with the fifteenth information and the maximum number of serving cells each of the first set to the seventh set can include in accordance with the sixteenth information may be the same.

The terminal device 1 may transmit, to the base station device 3, information on the maximum number of serving cells each of the first set to the seventh set can include in accordance with the fifteenth and/or sixteenth information.

Here, different tables may be defined for the case that the size of the CSI request field is two bits and the case that the size of the CSI request field is three bits. Alternatively, one common table may be defined for the case that the size of the CSI request field is two bits and the case that the size of the CSI request field is three bits.

As the information to be used to configure the first set (trigger1-r13), information to be used to configure the first set (trigger1-r10) may be used. As the information to be used to configure the second set (trigger2-r13), information to be used to configure the second set (trigger2-r10) may be used. In other words, the serving cell for which an aperiodic CSI report is triggered by any of the values in the 2-bit CSI request field and the serving cell for which an aperiodic CSI report is triggered by any of the values in the 3-bit CSI request field may be the same (common).

Here, the size of the CSI request field may be determined at least on the basis of the number of configured serving cells (downlink cells) and/or the search space onto which the DCI format is mapped. Alternatively, the size of the CSI request field may be determined at least on the basis of the number of activated serving cells (downlink cells) and/or the search space to which the DCI format is mapped.

For example, when one serving cell is configured for the terminal device 1, a 1-bit field may apply to the CSI request field (to a CSI request). When the DCI format is mapped onto the common search space, a 1-bit field may apply to the CSI request field. For example, the terminal device 1 for which one serving cell is configured may assume the size of the CSI request field to be one bit. When the DCI format is detected (received) in the common search space, the size of the CSI request field may be assumed to be one bit.

When the terminal device 1 is configured with more than one serving cell and the DCI format is mapped onto the UE-specific search space, a 2-bit field may apply to the CSI request field. As described above, the UE-specific search space may be given at least by C-RNTI. For example, when the DCI format is detected in the UE-specific search space, the terminal device 1 configured with more than one serving cell may assume the size of the CSI request field to be two bits.

When more than five serving cells are configured or activated and the DCI format is mapped to the UE-specific search space, a 3-bit field may apply to CSI request field. For example, when the DCI format is detected in the UE-specific search space, the terminal device 1 for which more than five serving cells are configured or activated may assume the size of the CSI request field to be three bits.

As described above, the base station device 3 and the terminal device 1 may perform the above-described operations in one PUCCH cell group. Here, one PUCCH cell group may be the PUCCH cell group to which the serving cell in which the PUSCH is scheduled by using the DCI format (in other words, the DCI format including a CSI request, which is also referred to as a corresponding DCI format below) belongs.

To be more specific, for example, when one serving cell is configured for the terminal device 1 in the PUCCH cell group to which the serving cell in which the PUSCH is scheduled by using the corresponding DCI format belongs, a 1-bit field may apply to the CSI request field. When the corresponding DCI format is mapped onto the common search space, a 1-bit field may apply to the CSI request field.

When more than one serving cell is configured for the terminal device 1 in the PUCCH cell group to which the serving cell in which the PUSCH is scheduled by using the corresponding DCI format belongs, and the corresponding DCI format is mapped onto the UE-specific search space, a 2-bit field may apply to the CSI request field.

When more than five serving cell is configured for the terminal device 1 in the PUCCH cell group to which the serving cell in which the PUSCH is scheduled by using the corresponding DCI format belongs, and the corresponding DCI format is mapped onto the UE-specific search space, a 3-bit field may apply to the CSI request field.

In other words, for example, in a case that the first PUCCH cell group and the second PUCCH cell group are configured, when one serving cell is configured in the first PUCCH cell group and the PUSCH for the serving cell belonging to the first PUCCH cell group is scheduled by using the DCI format mapped onto the UE-specific search space and/or the common search space, a 1-bit field may apply to the CSI request field.

In a case that the first PUCCH cell group and the second PUCCH cell group are configured, when one serving cell is configured in the second PUCCH cell group and the PUSCH for the serving cell belonging to the second PUCCH cell group is scheduled by using the DCI format mapped onto the UE-specific search space and/or the common search space, a 1-bit field may apply to the CSI request field.

For example, in a case that the first PUCCH cell group and the second PUCCH cell group are configured, when more than one serving cell is configured in the first PUCCH cell group and the PUSCH for the serving cell belonging to the first PUCCH cell group is scheduled by using the DCI format mapped onto the UE-specific search space, a 2-bit field may apply to the CSI request field.

In a case that the first PUCCH cell group and the second PUCCH cell group are configured, when more than one serving cell is configured in the second PUCCH cell group and the PUSCH for the serving cell belonging to the second PUCCH cell group is scheduled by using the DCI format mapped onto the UE-specific search space, a 2-bit field may apply to the CSI request field.

For example, in a case that the first PUCCH cell group and the second PUCCH cell group are configured, when more than five serving cells are configured or activated in the first PUCCH cell group and the PUSCH for the serving cell belonging to the first PUCCH cell group is scheduled by using the DCI format mapped onto the UE-specific search space, a 3-bit field may apply to the CSI request field.

In a case that the first PUCCH cell group and the second PUCCH cell group are configured, when more than five serving cells are configured or activated in the second PUCCH cell group and the PUSCH for the serving cell belonging to the second PUCCH cell group is scheduled by using the DCI format mapped onto the UE-specific search space, a 3-bit field may apply to the CSI request field.

In other words, in a case that, for the terminal device 1, one serving cell in the corresponding PUCCH cell group is configured or the corresponding DCI format is mapped onto the common search space, a 1-bit field may apply to the CSI request field. In a case that, for the terminal device 1, more than one serving cell in the corresponding PUCCH cell group is configured and the corresponding DCI format is mapped onto the UE-specific search space, a 2-bit field may apply to the CSI request field. In a case that, for the terminal device 1, more than five serving cells in the corresponding PUCCH cell group is configured and the corresponding DCI format is mapped onto the UE-specific search space, a 3-bit field may apply to the CSI request field.

Here, the corresponding PUCCH cell group is a PUCCH cell group to which the serving cell in which the PUSCH is scheduled by using the DCI format (in other words, the DCI format including a CSI request) belongs. The corresponding DCI format is a DCI format for requesting an aperiodic CSI report (in other words, a DCI format including a CSI request).

Here, in the present embodiment, description has been given of cases that the size of the CSI request field is one bit, two bits, and three bits, as examples. However, it goes without saying that the size of the CSI request field may be the number of bits larger than three.

As described above, the base station device 3 and the terminal device 1 may transmit and receive periodic CSI on the PUCCH in a certain subframe. The base station device 3 and the terminal device 1 may transmit and receive aperiodic CSI on the PUSCH in a certain subframe. Here, in case both periodic and aperiodic CSI reporting would occur in the same subframe, the terminal device 1 (UE) shall only transmit the aperiodic CSI report in that subframe. In other words, in a case that both periodic CSI reporting and aperiodic CSI reporting occur in the same subframe, the terminal device 1 may drop the periodic CSI report in the subframe.

Here, in a case that a periodic CSI report for a certain serving cell and an aperiodic CSI report for a serving cell different from the certain serving cell occur in the same subframe, the terminal device 1 may transmit both the periodic CSI report and the aperiodic CSI report in the subframe. In other words, in a case that a periodic CSI report and an aperiodic CSI report for different serving cells occur in the same subframe, the terminal device 1 may transmit both the periodic CSI report and the aperiodic CSI report in the subframe.

In other words, in a case that a periodic CSI report for a certain serving cell and an aperiodic CSI report for the certain serving cell occur in the same subframe, the terminal device 1 may only transmit the aperiodic CSI report in the subframe. In other words, in a case that a periodic CSI report and an aperiodic CSI report for the same serving cell occur in the same subframe, the terminal device 1 may only transmit the aperiodic CSI report in the subframe. In other words, in a case that periodic CSI reporting and aperiodic CSI reporting for the same serving cell occur in the same subframe, the terminal device 1 may drop the periodic CSI report in the subframe.

FIG. 6 is a diagram illustrating an instruction to only transmit uplink control information according to the present embodiment.

The operations, which will be described below with reference to FIG. 6, may be performed for each PUCCH cell group. To be more specific, the base station device 3 and the terminal device 1 may perform the operations to be described with reference to FIG. 6, in one PUCCH cell group. In the description referring to FIG. 6, configuring more than one serving cell may indicate configuring more than one and up to five serving cells.

In the description referring to FIG. 6, being set to trigger an aperiodic CSI report for more than one serving cell may indicate being set to trigger aperiodic CSI reports for more than one and up to five serving cells. "FIG. 5(a)" and "FIG. 5(b)" in FIG. 6 correspond respectively to FIG. 5A and FIG. 5B.

Here, the base station device 3 may instruct the terminal device 1 to transmit only uplink control information on the PUSCH. In other words, the base station device 3 may instruct transmission of uplink control information on PUSCH without UL-SCH data. To be more specific, upon instruction being made by the base station device 3, there is no transport block for UL-SCH and only uplink control information may be transmitted by the terminal device 1. Here, transmission of only uplink control information on the PUSCH may be included in an aperiodic CSI report.

Here, for example, transmission of only uplink control information on the PUSCH may be instructed at least on the basis of a value of the "CSI request" bit field, a modulation and coding scheme index (MCS index, also referred to as IMCS), and/or the number of allocated physical resource blocks (PRBs, also referred to as NPRB). Here, the value of the CSI request field, the MCS index, and the number of physical resource blocks may be included in the uplink DCI format (for example, DCI format 0 or DCI format 4).

As described above, the value of the CSI request field may be a value set in the field mapped to the CSI request (information to be used to request transmission of CSI) included in the uplink DCI format. The MCS index may be a value set in the field mapped to the information on the modulation and coding scheme and/or redundancy version (information to be used to indicate MCS and/or redundancy version) included in the uplink DCI format. The number of physical resource blocks may be based on a value set in the field mapped to the information on the resource block assignment and/or hopping resource allocation (information associated with resource block assignment) included in the uplink DCI format. Here, these pieces of information are related to the PUSCH.

The size of the CSI request field has been described above, and hence the description thereof is omitted below. In other words, the size of the CSI request field in the following description may be indicated (determined) by the above-described method.

For example, transmission of only uplink control information on the PUSCH may be instructed at least under the conditions that DCI format 0 is used, the MCS index is 29, the CSI request field (the size of the CSI request field) is one bit set to trigger an aperiodic CSI report, and the number of physical resource blocks is up to four.

Alternatively, transmission of only uplink control information on the PUSCH may be instructed at least under the conditions that DCI format 0 is used, the MCS index is 29, the CSI request field is two bits set to trigger an aperiodic CSI report for one serving cell, and the number of physical resource blocks is up to four.

Transmission of only uplink control information on the PUSCH may be instructed at least under the conditions that DCI format 0 is used, the MCS index is 29, the CSI request field is two bits set to trigger aperiodic CSI reports for more than one serving cell, and the number of physical resource blocks is up to 20.

Transmission of only uplink control information on the PUSCH may be instructed at least under the conditions that DCI format 0 is used, the MCS index is 29, the CSI request field is three bits set to trigger an aperiodic CSI report for one serving cell, and the number of physical resource blocks is up to four.

Transmission of only uplink control information on the PUSCH may be instructed at least under the conditions that DCI format 0 is used, the MCS index is 29, the CSI request field is three bits set to trigger aperiodic CSI reports for more than one serving cell, and the number of physical resource blocks is up to 20.

Transmission of only uplink control information on the PUSCH may be instructed at least under the conditions that DCI format 0 is used, the MCS index is 29, the CSI request field is three bits set to trigger aperiodic CSI reports for more than five serving cells. In other words, in a case that aperiodic CSI reports for more than five serving cells are triggered, the conditions under which transmission of uplink control information on the PUSCH is instructed do not need to include the number of physical resource blocks. In other words, any number may be set for the number of physical resource blocks. In other words, no restriction needs to be imposed on the number of physical resource blocks.

Transmission of only uplink control information on the PUSCH may be instructed at least under the conditions that DCI format 0 is used, the MCS index is 29, the CSI request field is two bits set to trigger aperiodic CSI reports for more than five serving cells, and the number of physical resource blocks is up to a predetermined number.

Here, the predetermined number may be a number defined by a specification or the like and known to the base station device 3 and the terminal device 1. For example, the predetermined number may be "0". In this case, transmission of only uplink control information may be transmission by using a PUSCH resource configured by the higher layers. For example, the base station device 3 may transmit the higher layer signaling including information to be used to configure the PUSCH resource for transmission of only uplink control information.

The predetermined number may be configured by the base station device 3. For example, the base station device 3 may transmit the higher layer signaling (or a DCI format) including information to be used to indicate (determine or calculate) the predetermined number. For example, the predetermined number may be indicated on the basis of the number of configured and/or activated serving cells. In other words, the predetermined number may be indicated on the basis of the above-described information to be used to configure the serving cell(s) and/or the above-described information to be used to activate the serving cell(s).

The predetermined number may be indicated on the basis of information to be used to indicate the number of CSIs simultaneously measured by the terminal device 1, which will be described later. Here, the information used to indicate the number of CSIs simultaneously measured by the terminal device 1 is transmitted from the base station device 3 to the terminal device 1. The prescribed number may be indicated on the basis of the information to be used to indicate the number of CSI processes. In other words, the predetermined number may be indicated on the basis of the information associated with the CSIs (transmission of the CSIs).

Transmission of only uplink control information on the PUSCH may be instructed at least under the conditions that DCI format 4 is used, one transport block (TB) is assumed to be enabled, the MCS index of the transport block assumed to be enabled is 29, the number of transmission layer is one, the CSI request field is one bit set to trigger an aperiodic CSI report, and the number of physical resource blocks is up to four.

Here, the number of transmission layers may be based on the value set in the field mapped to the information included in DCI format 4 (information to be used to indicate the number of transmission layers, which is also referred to as precoding information and number of layers). As described above, DCI format 4 includes information to be used to request CSI transmission, information to be used to indicate the MCS and/or redundancy version, and/or information associated with resource block assignment. Here, these pieces of information are for the PUSCH.

Transmission of only uplink control information on the PUSCH may be instructed at least under the conditions that DCI format 4 is used, one transport block is assumed to be enabled, the MCS index of the transport block assumed to be enabled is 29, the number of transmission layer is one, the CSI request field is two bits set to trigger an aperiodic CSI report for one serving cell, and the number of physical resource blocks is up to four.

Transmission of only uplink control information on the PUSCH may be instructed at least under the conditions that DCI format 4 is used, one transport block is assumed to be enabled, the MCS index of the transport block assumed to be enabled is 29, the number of transmission layer is one, the CSI request field is two bits set to trigger aperiodic CSI reports for more than one serving cell, and the number of physical resource blocks is up to 20.

Transmission of only uplink control information on the PUSCH may be instructed at least under the conditions that DCI format 4 is used, one transport block is assumed to be enabled, the MCS index of the transport block assumed to be enabled is 29, the number of transmission layer is one, the CSI request field is three bits set to trigger an aperiodic CSI report for one serving cell, and the number of physical resource blocks is up to four.

Transmission of only uplink control information on the PUSCH may be instructed at least under the conditions that DCI format 4 is used, one transport block is assumed to be enabled, the MCS index of the transport block assumed to be enabled is 29, the number of transmission layer is one, the CSI request field is three bits set to trigger aperiodic CSI reports for more than one serving cell, and the number of physical resource blocks is up to 20.

Transmission of only uplink control information on the PUSCH may be instructed at least under the conditions that DCI format 4 is used, one transport block is assumed to be enabled, the MCS index of the transport block assumed to be enabled is 29, the number of transmission layer is one, the CSI request field is three bits set to trigger aperiodic CSI reports for more than five serving cells.

Transmission of only uplink control information on the PUSCH may be instructed at least under the conditions that DCI format 4 is used, one transport block is assumed to be enabled, the MCS index of the transport block assumed to be enabled is 29, the number of transmission layer is one, the CSI request field is three bits set to trigger aperiodic CSI reports for more than five serving cells, and the number of physical resource blocks is up to the prescribed number. Here, the prescribed number has been described above, and hence the description thereof is omitted.

Here, a specification or the like may define in advance the trigger(s) for which CSI is reported in a case that the sum of the number of CSIs that are triggered but are not reported and the number of newly triggered CSIs exceeds the number of CSIs the terminal device 1 can simultaneously measure (calculate), in CSI reporting (aperiodic CSI reporting and/or periodic CSI reporting).

Here, the terminal device 1 may transmit information to be used to indicate the number of CSIs that can be simultaneously measured, to the base station device 3. For example, the terminal device 1 may transmit the higher layer signaling including information to be used to indicate the number of CSIs that can be simultaneously measured. Alternatively, the terminal device 1 may transmit information to be used to indicate the number of CSIs that can be simultaneously measured, as capability information. Here, information to be used to indicate the number of CSIs that can be simultaneously measured in one certain serving cell may be transmitted. Here, information to be used to indicate the number of CSIs that can be simultaneously measured by the terminal device 1 may be transmitted.

Here, the base station device 3 may configure (indicate), for the terminal device 1, the number of CSIs the terminal device 1 simultaneously measures (the number of CSIs to be simultaneously measured by the terminal device 1). For example, the base station device 3 may transmit the higher layer signaling including information to be used to indicate the number of CSIs that can be simultaneously measured by the terminal device 1. The terminal device 1 may compute (calculate) CSI(s) on the basis of the configured number of CSIs to be measured simultaneously. The base station device 3 and the terminal device 1 transmit and receive, to and from each other, the CSI(s) computed on the basis of the number of CSIs to be measured simultaneously, the number being configured by the base station device 3. This makes it possible to avoid a situation that the sum of the number of CSIs that are triggered but are not reported and the number of newly triggered CSIs exceeds the number of CSIs that can be simultaneously measured by the terminal device 1.

For example, the number of CSIs, which are supported by the terminal device 1, to be simultaneously measured may correspond to 5 CSI processes. The number of CSIs, which are supported by the terminal device 1, to be simultaneously measured may correspond to more than 5 CSI processes. The number of CSIs simultaneously measured by the terminal device 1 (the number of CSI processes to which the CSIs simultaneously measured by the terminal device 1 correspond) may be determined on the basis of the number of the configured and/or activated serving cells. The number of CSIs simultaneously measured by the terminal device 1 (the number of CSI processes to which the CSIs simultaneously measured by the terminal device 1 correspond) may be determined on the basis of the number of serving cells, which are supported by the terminal device 1, to be aggregated, or the number of the configured and/or activated serving cells. Hereinafter, for the purpose of easy description, the configured and/or activated serving cell is also referred to simply as the configured serving cell.

Here, the number of CSIs, which are supported by the terminal device 1, to be simultaneously measured may include the number of aperiodic CSI reports triggered in a certain one subframe. The number of CSIs, which are supported by the terminal device 1, to be simultaneously measured may also include the number of periodic CSI reports configured in a certain one subframe.

For example, in a case that more than one serving cell is configured for the terminal device 1, the number of CSI processes for the terminal device 1 may be more than one. Here, the CSI processes for the terminal device 1 may be the CSI processes to which the CSIs simultaneously measured by the terminal device 1 correspond. Here, as described above, configuring more than one serving cell may indicate configuring more than one and up to five serving cells. Further, configuring more than one CSI process may indicate configuring more than one and up to five CSI processes. Hereinafter, for the purpose of easy description, more than one and up to five CSI processes are referred to as X CSI processes.

In addition, in a case that more than five serving cells (which may be more than five downlink serving cells or more than five downlink component carriers) are configured for the terminal device 1, the number of CSI processes for the terminal device 1 may be more than five. Here, the CSI processes for the terminal device 1 may be the CSI processes to which the CSIs simultaneously measured by the terminal device 1 correspond. Here, in a case that the terminal device 1 supports aggregating more than five serving cells (which may be more than five downlink serving cells or more than five downlink component carriers), the number of CSI processes for the terminal device 1 may be more than five. Further, in a case that the terminal device 1 supports aggregating more than five serving cells, and more than five serving cells are configured for the terminal device 1, the number of CSI processes for the terminal device 1 may be more than five.

Here, the number of more than five CSI processes may be defined by a specification or the like in advance. For example, the number of more than five CSI process may be eight (8 CSI processes). The number of more than five CSI processes may be sixteen (16 CSI processes). For example, the number of more than five CSI processes may be determined on the basis of the higher layer information (parameter) transmitted from the base station device 3 to the terminal device 1. Hereinafter, for the purpose of easy description, more than five CSI processes is referred to as Y CSI processes.

As described above, the base station device 3 may transmit the higher layer signaling including information to be used to indicate the number of CSIs that can be simultaneously measured by the terminal device 1. In other words, the base station device 3 may transmit the higher layer signaling including information to be used to configure one or multiple CSI processes. In other words, the base station device 3 may configure X CSI processes for the terminal device 1 for which more than one serving cell is configured. The base station device 3 may also configure Y CSI processes for the terminal device 1 for which more than five serving cells are configured. Moreover, the base station device 3 may configure Y CSI processes for the terminal device 1 which supports aggregating more than five serving cells and for which more than five serving cells are configured.

In other words, the terminal device 1 may be expected to be configured with X CSI processes when configured with more than one serving cell. The terminal device 1 may not be expected to be configured with the CSI processes more than X CSI processes when configured with more than one serving cell. In other words, the terminal device 1 may not be required to update the CSI for the CSI processes more than X CSI processes when configured with more than one serving cell.

The terminal device 1 may be expected to be configured with Y CSI processes when configured with more than five serving cells. The terminal device 1 may not be expected to be configured with the CSI processes more than Y CSI processes when configured with more than five serving cells. In other words, the terminal device 1 may not be required to update the CSI for the CSI processes more than Y CSI processes when configured with more than five serving cells.

For example, the terminal device 1 which supports aggregating more than five serving cells may be expected to be configured with Y CSI processes when configured with more than five serving cells. The terminal device 1 which supports aggregating more than five serving cells may not be expected to be configured with the CSI processes more than Y CSI processes when configured with more than five serving cells. In other words, the terminal device 1 which supports aggregating more than five serving cells may not be required to update the CSI for the CSI processes more than Y CSI processes when configured with more than five serving cells.

Further, the terminal device 1 which supports aggregating more than five serving cells may be expected to be configured with X CSI processes when configured with more than one serving cell. The terminal device 1 which supports aggregating more than five serving cells may not be expected to be configured with the CSI processes more than X CSI processes when configured with more than one serving cell. In other words, the terminal device 1 which supports aggregating more than five serving cells may not be required to update the CSI for the CSI processes more than X CSI processes when configured with more than one serving cell.

Here, in a case that more than five serving cells (which may be more than five downlink serving cells or more than five downlink component carriers) are configured for the terminal device 1, X CSI processes may be configured for the terminal device 1. In a case that the terminal device 1 supports aggregating more than five serving cells (which may be more than five downlink serving cells or more than five downlink component carriers), X CSI processes may be configured for the terminal device 1. Further, in a case that the terminal device 1 supports aggregating more than five serving cells, and more than five serving cells are configured for the terminal device 1, X CSI processes may be configured for the terminal device 1.

Configurations of devices according to the present embodiment will be described below.

Figure 7:
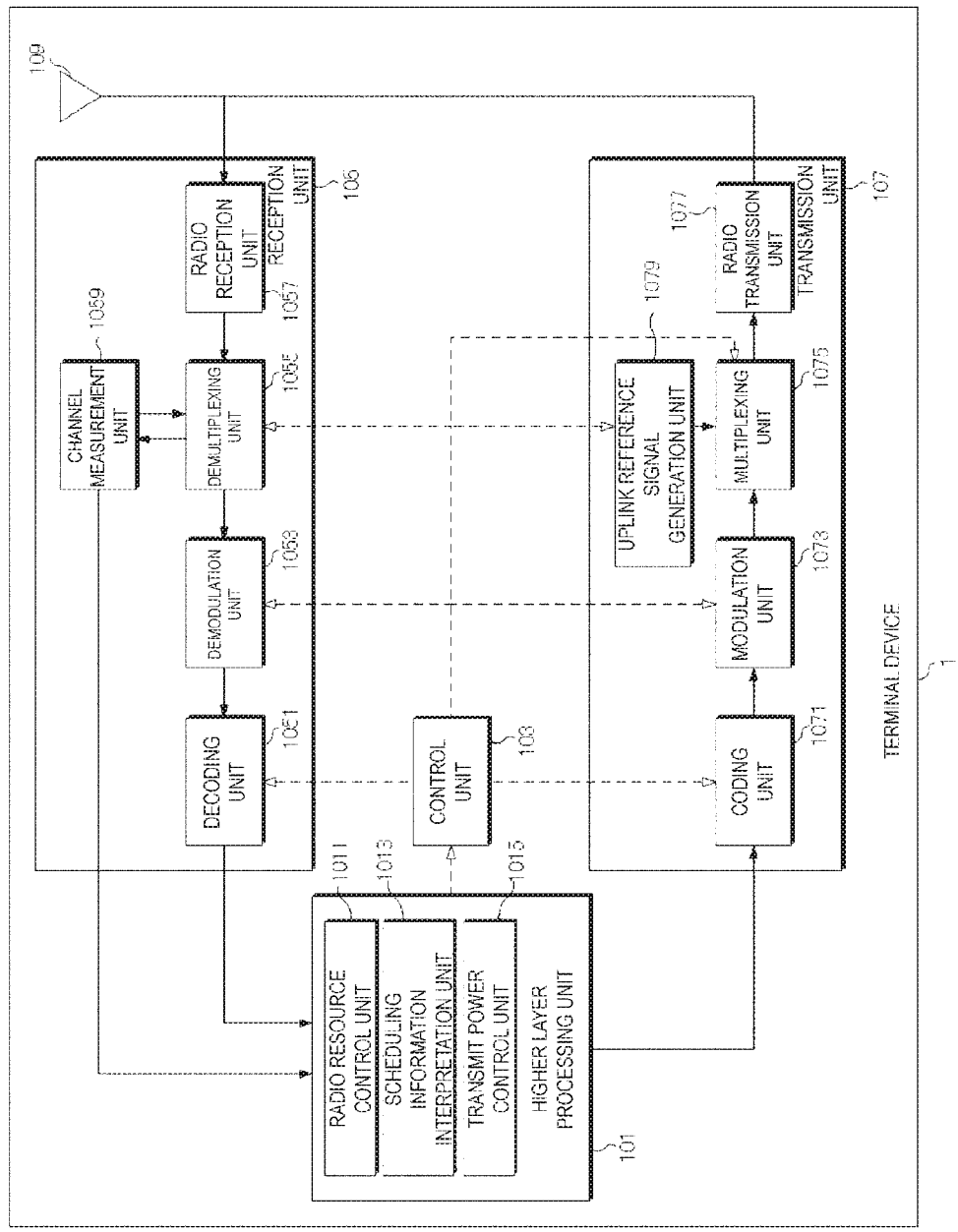
FIG. 7 is a schematic block diagram illustrating a configuration of a terminal device 1 according to the present embodiment.

FIG. 7 is a schematic block diagram illustrating a configuration of the terminal device 1 according to the present embodiment. As illustrated in FIG. 7, the terminal device 1 is configured to include a higher layer processing unit 101, a control unit 103, a reception unit 105, a transmission unit 107, and a transmit and receive antenna 109. The higher layer processing unit 101 is configured to include a radio resource control unit 1011, a scheduling information interpretation unit 1013, and a transmit power control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various configuration information/parameters of the terminal device 1 itself. The radio resource control unit 1011 sets the various configuration information/parameters in accordance with higher layer signaling received from the base station device 3. To be more specific, the radio resource control unit 1011 sets the various configuration information/parameters in accordance with the information indicating the various configuration information/parameters received from the base station device 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The transmit power control unit 1015 included in the higher layer processing unit 101 controls the transmit power for transmission on the PUSCH and the PUCCH in accordance with various configuration information/parameters managed by the radio resource control unit 1011, a TPC command, and the like.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a cyclic prefix (CP) from the digital signal resulting from the conversion, performs fast Fourier transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data in accordance with information on a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through multiple input multiple output spatial multiplexing (MIMO SM), and performs precoding on the sequences.

The uplink reference signal generation unit 1079 generates a sequence acquired in accordance with a rule (formula) prescribed in advance, on the basis of a physical layer cell identifier (also referred to as a physical cell identity (PCI), a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 8:
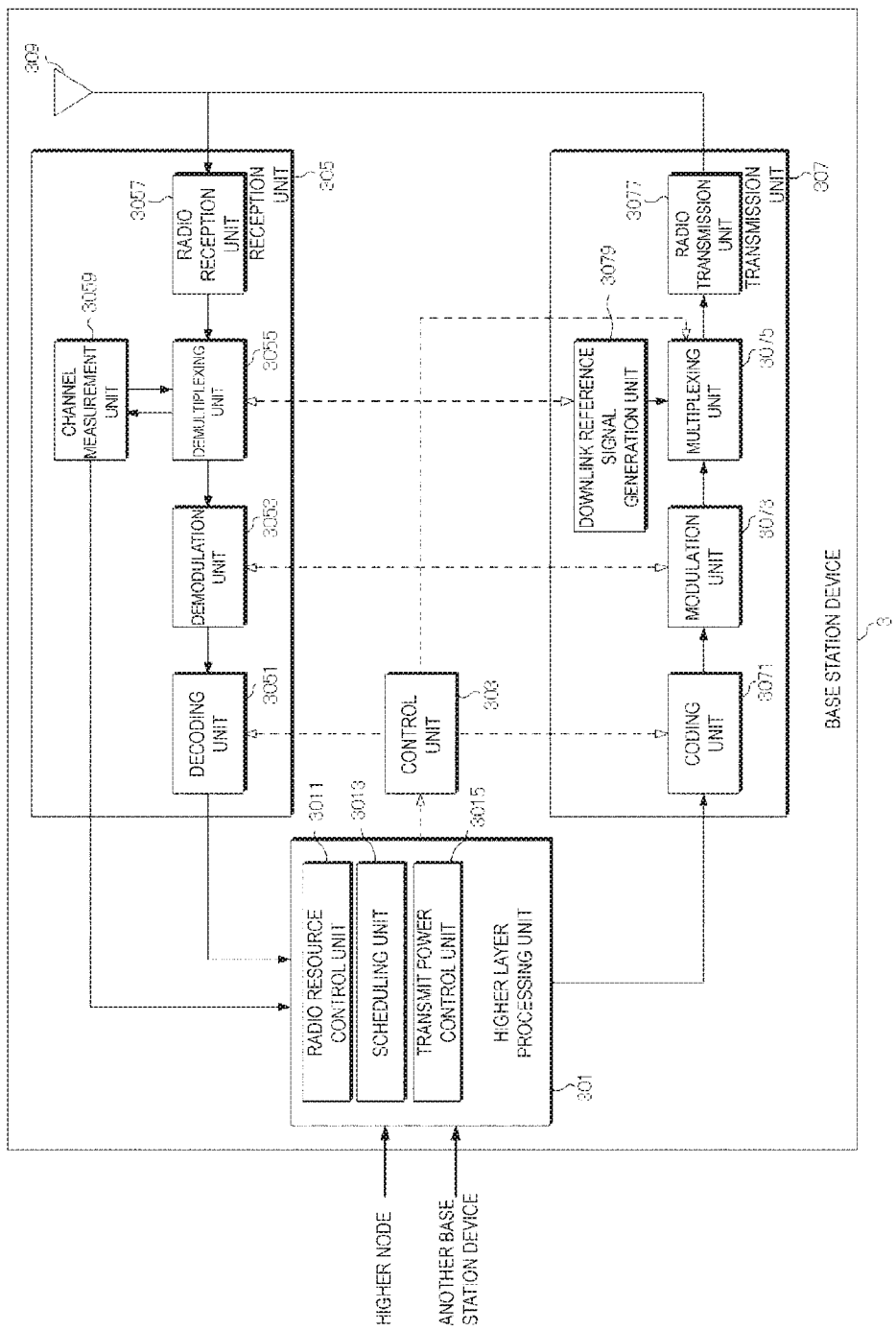
FIG. 8 is a schematic block diagram illustrating a configuration of a base station device 3 according to the present embodiment.

FIG. 8 is a schematic block diagram illustrating a configuration of the base station device 3 according to the present embodiment. As illustrated in FIG. 8, the base station device 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a transmit power control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC control element (CE), and the like, and outputs a result of the generation or the acquirement to the transmission unit 307. Furthermore, the radio resource control unit 3011 manages various configuration information/parameters for each of the terminal devices 1. The radio resource control unit 3011 may set various configuration information/parameters for each of the terminal devices 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (for example, the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The transmit power control unit 3015 included in the higher layer processing unit 301 controls the transmit power for transmission on the PUSCH and the PUCCH performed by the terminal device 1, in accordance with various configuration information/parameters managed by the radio resource control unit 3011, a TPC command, and the like.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal. The reception unit 305 receives uplink control information.

The radio reception unit 3057 removes a portion corresponding to a cyclic prefix (CP) from the digital signal resulting from the conversion. The radio reception unit 3057 performs fast Fourier transform (FFT) on the signal from which the CP has been removed, extracts a signal in the frequency domain, and outputs the resulting signal to the demultiplexing unit 3055.

The demultiplexing unit 3055 demultiplexes the signal input from the radio reception unit 3057 into the PUCCH, the PUSCH, and the signal such as the uplink reference signal. The demultiplexing is performed on the basis of radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notifies in advance each of the terminal devices 1 with the uplink grant. The demodulation unit 3053 demultiplexes the modulation symbols of multiple pieces of uplink data transmitted on the same PUSCH with the MIMO SM, on the basis of the number of spatial-multiplexed sequences notified in advance with the uplink grant to each of the terminal devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired in accordance with a rule prescribed in advance on the basis of the physical layer cell identifier (PCI) for identifying the base station device 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs inverse fast Fourier transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

More specifically, the terminal device 1 according to the present embodiment includes: the reception unit 105 configured to receive higher layer signaling including the first information to be used to configure multiple PUCCH cell groups, receive the higher layer signaling including the second information to be used to configure a set of one or multiple serving cells, and receive the higher layer signaling including the third information to be used to configure a set of one or multiple serving cells; and the transmission unit 107 configured to perform an aperiodic CSI report on the basis of a value of a 2-bit CSI request field and the second information in a case that more than one serving cell is configured in one PUCCH cell group, among the multiple PUCCH cell groups, to which a serving cell having a PUSCH scheduled therefor with a DCI format belongs, and perform an aperiodic CSI report on the basis of a value of a 3-bit CSI request field and the third information in a case that more than five serving cells are configured in one PUCCH cell group, among the multiple PUCCH cell groups, to which a serving cell having a PUSCH scheduled therefor with a DCI format belongs.

Here, in a case that one serving cell is configured in one PUCCH cell group, among the multiple PUCCH cell groups, to which a serving cell having a PUSCH scheduled therefor with a DCI format belongs, the transmission unit 107 performs an aperiodic CSI report for the one serving cell on the basis of a value of a 1-bit CSI request field.

The base station device 3 according to the present embodiment includes: the transmission unit 307 configured to transmit higher layer signaling including the first information to be used to configure multiple PUCCH cell groups, transmit the higher layer signaling including the second information to be used to configure a set of one or multiple serving cells, and transmit the higher layer signaling including the third information to be used to configure a set of one or multiple serving cells; and the reception unit 305 configured to receive an aperiodic CSI report on the basis of a value of a 2-bit CSI request field and the second information in a case that more than one serving cell is configured in one PUCCH cell group, among the multiple PUCCH cell groups, to which a serving cell having a PUSCH scheduled therefor with a DCI format belongs, and receive an aperiodic CSI report on the basis of a value of a 3-bit CSI request field and the third information in a case that more than five serving cells are configured in one PUCCH cell group, among the multiple PUCCH cell groups, to which a serving cell having a PUSCH scheduled therefor with a DCI format belongs.

Here, in a case that one serving cell is configured in one PUCCH cell group, among the multiple PUCCH cell groups, to which a serving cell having a PUSCH scheduled therefor with a DCI format belongs, the reception unit 305 receives an aperiodic CSI report for the one serving cell on the basis of a value of a 1-bit CSI request field.

The terminal device 1 according to the present embodiment includes: the reception unit 105 configured to receive DCI format 0 including a CSI request, information to be used to indicate an MCS index, and information to be used to allocate a physical resource block; and the transmission unit 107 configured to transmit only uplink control information on a PUSCH in a case that the MCS index is 29, the CSI request field is three bits set to trigger an aperiodic CSI report for one serving cell, and the number of the physical resource blocks is equal to or less than four, transmit only uplink control information on a PUSCH in a case that the MCS index is 29, the CSI request field is three bits set to trigger aperiodic CSI reports for more than one serving cell, and the number of the physical resource blocks is equal to or less than 20, and transmit only uplink control information on a PUSCH in a case that the MCS index is 29, the CSI request field is three bits set to trigger aperiodic CSI reports for more than five serving cells, irrespective of the number of the physical resource blocks.

Here, the reception unit 105 receives DCI format 4 including a CSI request, information to be used to indicate an MCS index, information to be used to allocate a physical resource block, and information to be used to indicate a transmission layer, and the transmission unit 107 transmits only uplink control information on a PUSCH in a case that one transport block is assumed to be effective, the MCS index corresponding to the transport block assumed to be effective is 29, the number of transmission layers is one, the CSI request field is three bits set to trigger aperiodic CSI report for one serving cell, and the number of the physical resource blocks is up to four, transmits only uplink control information on a PUSCH in a case that one transport block is assumed to be effective, the MCS index for the transport block assumed to be effective is 29, the number of transmission layer is one, the CSI request field is three bits set to trigger aperiodic CSI reports for more than one serving cell, and the number of the physical resource blocks is up to 20, and transmits only uplink control information on a PUSCH in a case that one transport block is assumed to be effective, the MCS index for the transport block assumed to be effective is 29, the number of transmission layer is one, the CSI request field is three bits set to trigger aperiodic CSI reports for more than five serving cells, irrespective of the number of the physical resource blocks.

The base station device 3 according to the present embodiment includes the transmission unit 307 configured to transmit DCI format 0 including a CSI request, information to be used to indicate an MCS index, and information to be used to allocate a physical resource block; and the reception unit 305 configured to receive only uplink control information on a PUSCH in a case that the MCS index is 29, the CSI request filed is three bits set to trigger an aperiodic CSI report for one serving cell, and the number of the physical resource blocks is equal to four or smaller, receive only uplink control information on a PUSCH in a case that the MCS index is 29, the CSI request field is three bits set to trigger aperiodic CSI reports for more than one serving cell, and the number of the physical resource blocks is equal to or less than 20, and receive only uplink control information on a PUSCH in a case that the MCS index is 29, the CSI request field is three bits set to trigger aperiodic CSI reports for more than five serving cells, irrespective of the number of the physical resource blocks.

Here, the transmission unit 307 transmits DCI format 4 including a CSI request, information to be used to indicate an MCS index, information to be used to allocate a physical resource block, and information to be used to indicate a transmission layer, and the reception unit 305 receives only uplink control information on a PUSCH in a case that one transport block is assumed to be effective, the MCS index corresponding to the transport block assumed to be effective is 29, the number of transmission layers is one, the CSI request filed is three bits set to trigger an aperiodic CSI report for one serving cell, and the number of the physical resource blocks is up to four, receives only uplink control information on a PUSCH in a case that one transport block is assumed to be effective, the MCS index for the transport block assumed to be effective is 29, the number of transmission layer is one, the CSI request filed is three bits set to trigger aperiodic CSI reports for more than one serving cell, and the number of the physical resource blocks is up to 20, and receives only uplink control information on a PUSCH in a case that one transport block is assumed to be effective, the MCS index for the transport block assumed to be effective is 29, the number of transmission layers is one, the CSI request filed is three bits set to trigger aperiodic CSI reports for more than five serving cells.

The terminal device 1 according to the present embodiment includes: the reception unit 105 configured to receive information for configuring a primary cell to be used to transmit HARQ-ACK in a first PUCCH cell group and receive information for configuring a first secondary cell to be used to transmit HARQ-ACK in a second PUCCH cell group; and the transmission unit 107 configured to transmit HARQ-ACK for transmission on a PDSCH in only the primary cell in the first PUCCH cell group with a first PUCCH resource in a first PUCCH format in the primary cell, transmit HARQ-ACK for transmission on a PDSCH in a second secondary cell in the first PUCCH cell group with a second PUCCH resource in a second PUCCH format in the primary cell, transmit HARQ-ACK for transmission on a PDSCH in only the first secondary cell in the second PUCCH cell group with the second PUCCH resource in the second PUCCH format in the first secondary cell, and transmit HARQ-ACK for transmission on a PDSCH in a third secondary cell in the second PUCCH cell group with the second PUCCH resource in the second PUCCH format in the first secondary cell.

The base station device 3 according to the present embodiment includes: the transmission unit 307 configured to transmit information for configuring a primary cell to be used to transmit HARQ-ACK in a first PUCCH cell group and transmit information for configuring a first secondary cell to be used to transmit HARQ-ACK in a second PUCCH cell group; and the reception unit 305 configured to receive HARQ-ACK for transmission on a PDSCH in only the primary cell in the first PUCCH cell group via a first PUCCH resource in a first PUCCH format in the primary cell, receive HARQ-ACK for transmission on a PDSCH in a second secondary cell in the first PUCCH cell group via a second PUCCH resource in a second PUCCH format in the primary cell, receive HARQ-ACK for transmission on a PDSCH in only the first secondary cell in the second PUCCH cell group via the second PUCCH resource in the second PUCCH format in the first secondary cell, and receive HARQ-ACK for transmission on a PDSCH in a third secondary cell in the second PUCCH cell group via the second PUCCH resource in the second PUCCH format in the first secondary cell.

The terminal device 1 according to the present embodiment includes the transmission unit 307 configured to, in a case that transmission of HARQ-ACK in a certain serving cell and a periodic CSI report in the certain serving cell collide in one subframe without any PUSCH, transmit the periodic CSI report multiplexed with the HARQ-ACK on a PUCCH in the certain serving cell, and, in a case that transmission of HARQ-ACK in the certain serving cell and a periodic CSI report in a serving cell different from the certain serving cell collide in one subframe without any PUSCH, transmit the HARQ-ACK on a PUCCH in the certain serving cell while transmitting the periodic CSI report on a PUCCH in the serving cell different from the certain serving cell.

The terminal device 1 according to the present embodiment includes the reception unit 305 configured to receive first information to be used to permit transmission of the HARQ-ACK and the periodic CSI report in the certain serving cell in one subframe without the PUSCH and receive second information to be used to permit transmission of the HARQ-ACK in the certain serving cell and transmission of the periodic CSI report in the serving cell different from the certain serving cell in one subframe without the PUSCH.

The terminal device 1 according to the present embodiment includes the transmission unit 307 configured to, in a case that transmission of HARQ-ACK in a certain serving cell and a periodic CSI report in the certain serving cell collide in one subframe without any PUSCH, transmit the periodic CSI report multiplexed with the HARQ-ACK on a PUCCH in the certain serving cell, and, in a case that transmission of HARQ-ACK in the certain serving cell and a periodic CSI report in a serving cell different from the certain serving cell collide in one subframe without any PUSCH, transmit the HARQ-ACK on a PUCCH in the certain serving cell while dropping the periodic CSI report.

The base station device 3 according to the present embodiment includes the reception unit 305 configured to, in a case that transmission of HARQ-ACK in a certain serving cell and a periodic CSI report in the certain serving cell collide in one subframe without any PUSCH, receive the periodic CSI report multiplexed with the HARQ-ACK on a PUCCH in the certain serving cell, and, in a case that transmission of HARQ-ACK in the certain serving cell and a periodic CSI report in a serving cell different from the certain serving cell collide in one subframe without any PUSCH, receive the HARQ-ACK on a PUCCH in the certain serving cell while receiving the periodic CSI report on a PUCCH in the serving cell different from the certain serving cell.

The base station device 3 according to the present embodiment includes the transmission unit 307 configured to transmit first information to be used to permit transmission of the HARQ-ACK and the periodic CSI report in the certain serving cell in one subframe without the PUSCH and transmit second information to be used to permit transmission of the HARQ-ACK in the certain serving cell and transmission of the periodic CSI report in the serving cell different from the certain serving cell in one subframe without the PUSCH.

The base station device 3 according to the present embodiment includes the reception unit 305 configured to, in a case that transmission of HARQ-ACK in a certain serving cell and a periodic CSI report in the certain serving cell collide in one subframe without any PUSCH, receive the periodic CSI report multiplexed with the HARQ-ACK on a PUCCH in the certain serving cell, and, in a case that transmission of HARQ-ACK in the certain serving cell and a periodic CSI report in a serving cell different from the certain serving cell collide in one subframe without any PUSCH, receive the HARQ-ACK on a PUCCH in the certain serving cell while assuming that the periodic CSI report is dropped.

With this configuration, the terminal device can efficiently perform processing relating to transmit power.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. The information handled in these devices is temporarily stored in a random access memory (RAM) while being processed. Thereafter, the information is stored in various types of read only memory (ROM) such as a flash ROM and a hard disk drive (HDD) and when necessary, is read by the CPU to be modified or rewritten.

Moreover, the terminal device 1 and the base station device 3 according to the above-described embodiment may be partially realized by a computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiment can be realized as an aggregation (a device group) constituted of multiple devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can also communicate with the base station device as the aggregation.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the terminal device is described as one example of a communication device, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

INDUSTRIAL APPLICABILITY

The present invention can be applied to mobile phones, personal computers, tablet computers, and the like.

DESCRIPTION OF REFERENCE NUMERALS 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Transmit power control unit
3011 Radio resource control unit
3013 Scheduling unit
3015 Transmit power control unit

The invention claimed is:

1. A terminal device that communicates with a base station device using a plurality of serving cells, the plurality of serving cells including a primary cell and a secondary cell, the terminal device comprising:
receiving circuitry configured to:
receive a radio resource control signal including first information used for indicating a simultaneous transmission of Hybrid Automatic Repeat Request-Acknowledgment (HARQ-ACK) and channel state information (CSI) by using a first physical uplink control channel (PUCCH) format,
receive a radio resource control signal including second information used for configuring a first PUCCH resource,
receive a radio resource control signal including third information used for configuring four second PUCCH resources,
receive on a physical downlink control channel (PDCCH), fourth information used for indicating a second PUCCH resource of the four second PUCCH resources; and
transmitting circuitry configured to transmit the HARQ-ACK and the CSI in a subframe, wherein
in a case that the first PUCCH format is configured and the simultaneous transmission of the HARQ-ACK and the CSI is indicated by using the first information, the first PUCCH format and the first PUCCH resource is used for transmission of the HARQ-ACK and the CSI if the HARQ-ACK is corresponding to a physical downlink shared channel (PDSCH) transmission only on the primary cell, and,
in a case that the first PUCCH format is configured and the simultaneous transmission of the HARQ-ACK and the CSI is indicated by using the first information, the first PUCCH format and the second PUCCH resource is used, based on the total number of HARQ-ACK bits and CSI bits, for transmission of the HARQ-ACK and the CSI if the HARQ-ACK is corresponding to the PDSCH transmission on the secondary cell.

2. The terminal device according to claim 1, wherein the HARQ-ACK is an acknowledgment (ACK) or a negative acknowledgment (NACK).

3. A base station device that communicates with a terminal device using a plurality of serving cells, the plurality of serving cells including a primary cell and a secondary cell, the base station device comprising:
transmitting circuitry configured to:
transmit a radio resource control signal including first information used for indicating a simultaneous transmission of Hybrid Automatic Repeat Request-Acknowledgment (HARQ-ACK) and channel state information (CSI) by using a first physical uplink control channel (PUCCH) format,
transmit a radio resource control signal including second information used for configuring a first PUCCH resource,
transmit a radio resource control signal including third information used for configuring four second PUCCH resources,
transmit on a physical downlink control channel (PDCCH), fourth information used for indicating a second PUCCH resource of the four second PUCCH resources; and
receiving circuitry configured to receive the HARQ-ACK and the CSI in a subframe, wherein
in a case that the first PUCCH format is configured and the simultaneous transmission of the HARQ-ACK and the CSI is indicated by using the first information, the first PUCCH format and the first PUCCH resource is used for reception of the HARQ-ACK and the CSI if the HARQ-ACK is corresponding to a physical downlink shared channel (PDSCH) transmission only on the primary cell, and,
in a case that the first PUCCH format is configured and the simultaneous transmission of the HARQ-ACK and the CSI is indicated by using the first information, the first PUCCH format and the second PUCCH resource is used, based on the total number of HARQ-ACK bits and CSI bits, for reception of the HARQ-ACK and the CSI if the HARQ-ACK is corresponding to the PDSCH transmission on the secondary cell.

4. The base station device according to claim 3, wherein the HARQ-ACK is an acknowledgment (ACK) or a negative acknowledgment (NACK).

5. A communication method of a terminal device that communicates with a base station device using a plurality of serving cells, the plurality of serving cells including a primary cell and a secondary cell, the communication method comprising:

receiving a radio resource control signal including first information used for indicating a simultaneous transmission of Hybrid Automatic Repeat Request-Acknowledgment (HARQ-ACK) and channel state information (CSI) by using a first physical uplink control channel (PUCCH) format, receiving a radio resource control signal including second information used for configuring a first PUCCH resource, receiving a radio resource control signal including third information used for configuring four second PUCCH resources, receiving on a physical downlink control channel (PDCCH), fourth information used for indicating a second PUCCH resource of the four second PUCCH resources; and transmitting the HARQ-ACK and the CSI in a subframe, wherein in a case that the first PUCCH format is configured and the simultaneous transmission of the HARQ-ACK and the CSI is indicated by using the first information, the first PUCCH format and the first PUCCH resource is used for transmission of the HARQ-ACK and the CSI if the HARQ-ACK is corresponding to a physical downlink shared channel (PDSCH) transmission only on the primary cell, and, in a case that the first PUCCH format is configured and the simultaneous transmission of the HARQ-ACK and the CSI is indicated by using the first information, the first PUCCH format and the second PUCCH resource is used, based on the total number of HARQ-ACK bits and CSI bits, for transmission of the HARQ-ACK and the CSI if the HARQ-ACK is corresponding to the PDSCH transmission on the secondary cell.

6. A communication method of a base station device that communicates with a terminal device using a plurality of serving cells, the plurality of serving cells including a primary cell and a secondary cell, the communication method comprising:

transmitting a radio resource control signal including first information used for indicating a simultaneous transmission of Hybrid Automatic Repeat Request-Acknowledgment (HARQ-ACK) and channel state information (CSI) by using a first physical uplink control channel (PUCCH) format, transmitting a radio resource control signal including second information used for configuring a first PUCCH resource, transmitting a radio resource control signal including third information used for configuring four second PUCCH resources, transmitting on a physical downlink control channel (PDCCH), fourth information used for indicating a second PUCCH resource of the four second PUCCH resources; and receiving the HARQ-ACK and the CSI in a subframe, wherein in a case that the first PUCCH format is configured and the simultaneous transmission of the HARQ-ACK and the CSI is indicated by using the first information, the first PUCCH format and the first PUCCH resource is used for reception of the HARQ-ACK and the CSI if the HARQ-ACK is corresponding to a physical downlink shared channel (PDSCH) transmission only on the primary cell, and, in a case that the first PUCCH format is configured and the simultaneous transmission of the HARQ-ACK and the CSI is indicated by using the first information, the first PUCCH format and the second PUCCH resource is used, based on the total number of HARQ-ACK bits and CSI bits, for reception of the HARQ-ACK and the CSI if the HARQ-ACK is corresponding to the PDSCH transmission on the secondary cell.

7. An integrated circuit mounted on a terminal device that communicates with a base station device using a plurality of serving cells, the plurality of serving cells including a primary cell and a secondary cell, the integrated circuit causing the terminal device to perform the functions of:

receiving a radio resource control signal including first information used for indicating a simultaneous transmission of Hybrid Automatic Repeat Request-Acknowledgment (HARQ-ACK) and channel state information (CSI) by using a first physical uplink control channel (PUCCH) format, receiving a radio resource control signal including second information used for configuring a first PUCCH resource, receiving a radio resource control signal including third information used for configuring four second PUCCH resources, receiving on a physical downlink control channel (PDCCH), fourth information used for indicating a second PUCCH resource of the four second PUCCH resources; and transmitting the HARQ-ACK and the CSI in a subframe, wherein in a case that the first PUCCH format is configured and the simultaneous transmission of the HARQ-ACK and the CSI is indicated by using the first information, the first PUCCH format and the first PUCCH resource is used for transmission of the HARQ-ACK and the CSI if the HARQ-ACK is corresponding to a physical downlink shared channel (PDSCH) transmission only on the primary cell, and, in a case that the first PUCCH format is configured and the simultaneous transmission of the HARQ-ACK and the CSI is indicated by using the first information, the first PUCCH format and the second PUCCH resource is used, based on the total number of HARQ-ACK bits and CSI bits, for transmission of the HARQ-ACK and the CSI if the HARQ-ACK is corresponding to the PDSCH transmission on the secondary cell.

8. An integrated circuit mounted on a terminal device that communicates with a base station device using a plurality of serving cells, the plurality of serving cells including a primary cell and a secondary cell, the integrated circuit causing the terminal device to perform the functions of:

transmitting a radio resource control signal including first information used for indicating a simultaneous transmission of Hybrid Automatic Repeat Request-Acknowledgment (HARQ-ACK) and channel state information (CSI) by using a first physical uplink control channel (PUCCH) format, transmitting a radio resource control signal including second information used for configuring a first PUCCH resource, transmitting a radio resource control signal including third information used for configuring four second PUCCH resources, transmitting on a physical downlink control channel (PD-CCH), fourth information used for indicating a second PUCCH resource of the four second PUCCH resources; and receiving the HARQ-ACK and the CSI in a subframe, wherein in a case that the first PUCCH format is configured and the simultaneous transmission of the HARQ-ACK and the CSI is indicated by using the first information, the first PUCCH format and the first PUCCH resource is used for reception of the HARQ-ACK and the CSI if the HARQ-ACK is corresponding to a physical downlink shared channel (PDSCH) transmission only on the primary cell, and, in a case that the first PUCCH format is configured and the simultaneous transmission of the HARQ-ACK and the CSI is indicated by using the first information, the first PUCCH format and the second PUCCH resource is used, based on the total number of HARQ-ACK bits and CSI bits, for reception of the HARQ-ACK and the CSI if the HARQ-ACK is corresponding to the PDSCH transmission on the secondary cell.

* * * * *